(12) United States Patent
Kim et al.

(10) Patent No.: US 11,514,843 B2
(45) Date of Patent: Nov. 29, 2022

(54) DISPLAY DEVICE AND DRIVING METHOD THEREOF

(71) Applicant: SAMSUNG DISPLAY CO., LTD., Yongin-si (KR)

(72) Inventors: Hyeon Min Kim, Yongin-si (KR); Hyun Jun Lim, Yongin-si (KR); Young Wook Yoo, Yongin-si (KR); Jun Gyu Lee, Yongin-si (KR); Byung Ki Chun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/406,408

(22) Filed: Aug. 19, 2021

(65) Prior Publication Data
US 2022/0198997 A1 Jun. 23, 2022

(30) Foreign Application Priority Data
Dec. 21, 2020 (KR) ........................ 10-2020-0180053

(51) Int. Cl.
*G09G 3/32* (2016.01)
*G06K 9/62* (2022.01)
*G06V 10/75* (2022.01)

(52) U.S. Cl.
CPC ............. *G09G 3/32* (2013.01); *G06K 9/6215* (2013.01); *G06V 10/751* (2022.01); *G09G 2310/08* (2013.01); *G09G 2320/0257* (2013.01); *G09G 2320/0686* (2013.01)

(58) Field of Classification Search
CPC ............. G09G 3/32; G09G 2320/0686; G09G 2320/0257; G09G 2310/08; G06K 9/6215; G06V 10/751
See application file for complete search history.

(56) References Cited

U.S. PATENT DOCUMENTS

| 9,691,353 B2* | 6/2017 | Joo .......................... G09G 5/10 |
| 10,748,317 B2 | 8/2020 | Park |
| 2014/0146071 A1* | 5/2014 | Kim ...................... G09G 3/3225 345/589 |

(Continued)

FOREIGN PATENT DOCUMENTS

| KR | 1020200026421 A | 3/2020 |
| KR | 1020200027617 A | 3/2020 |

(Continued)

*Primary Examiner* — Muhammad N Edun
(74) *Attorney, Agent, or Firm* — Cantor Colburn LLP

(57) ABSTRACT

A display device includes: pixels arranged in a display area; a timing controller which generates image data of each frame based on an input image signal of the each frame, the timing controller including a logo controller which detects a logo image and a logo area including the logo image from the input image signal of the each frame to control luminance of the logo image; and a data driver which generates a data signal based on the image data and supplies the data signal to the pixels. The logo controller generates a first logo map based on an input image signal of a previous frame, generates a second logo map based on an input image signal of a current frame, and determines a similarity between the first logo map and the second logo map to selectively change luminance of a logo image of a next frame.

18 Claims, 13 Drawing Sheets

(56) References Cited

U.S. PATENT DOCUMENTS

| | | | |
|---|---|---|---|
| 2015/0007217 A1* | 1/2015 | Wood | H04N 21/8146 |
| | | | 725/32 |
| 2020/0074596 A1 | 3/2020 | Chun et al. | |
| 2020/0074708 A1* | 3/2020 | Park | G06T 7/90 |
| 2020/0082796 A1 | 3/2020 | Chun et al. | |

FOREIGN PATENT DOCUMENTS

| KR | 1020200030711 A | 3/2020 |
|---|---|---|
| KR | 1020220011840 A | 2/2022 |

* cited by examiner

DISPLAY DEVICE AND DRIVING METHOD THEREOF

This application claims priority to Korean Patent Application No. 10-2020-0180053, filed on Dec. 21, 2020, and all the benefits accruing therefrom under 35 U.S.C. § 119, the content of which in its entirety is herein incorporated by reference.

BACKGROUND

(a) Field

Embodiments of the invention relate to a display device and a driving method thereof.

(b) Description of the Related Art

Recently, interest in an information display is increasing. Accordingly, research and development on a display device are continuously being conducted.

SUMMARY

The invention has been made in an effort to provide a display device and a driving method thereof that may prevent afterimages due to continuously displaying a logo image and may improve image quality.

An embodiment of the invention provides a display device including: pixels arranged in a display area; a timing controller which generates image data of each frame based on an input image signal of the each frame, where the timing controller includes a logo controller which detects a logo image and a logo area including the logo image from the input image signal of the each frame to control luminance of the logo image; and a data driver which generates a data signal based on the image data and supplies the data signal to the pixels. In such an embodiment, the logo controller generates a first logo map based on an input image signal of a previous frame; generates a second logo map based on an input image signal of a current frame; and determines a similarity between the first logo map and the second logo map to selectively change luminance of a logo image of a next frame.

In an embodiment, the logo controller may determine whether logo images in the first logo map and the second logo map match with each other based on the similarity between the first logo map and the second logo map; and may compensate for the luminance of the logo image of the next frame based on the first logo map when it is determined that the logo images in the first logo map and the second logo map match with each other.

In an embodiment, the logo controller may set an edge area of the logo area as a boundary area, may determine whether the second logo map includes an error based on boundary area data for the boundary area, and may initialize compensation data for the logo image when it is determined that the logo images in the first logo map and the second logo map do not match with each other and the second logo map includes the error.

In an embodiment, the logo controller may set an edge area of the logo area as a boundary area, may determine whether the second logo map includes an error based on boundary area data for the boundary area, and may compensate for the luminance of the logo image of the next frame based on the second logo map when it is determined that the logo images in the first logo map and the second logo map do not match with each other and the second logo map does not include the error.

In an embodiment, the logo controller may include: a logo extractor which detects the logo image and the logo area from the input image signal of the each frame to extract logo area data; a logo map generator which generates the first logo map based on the logo area data of the previous frame and generates the second logo map based on the logo area data of the current frame; a logo determiner which generates first determination data based on the second logo map, compares the first logo map and the second logo map to generate second determination data, and generates a compensation control signal based on the first determination data and the second determination data; and a luminance compensation block which selectively compensates for the luminance of the logo image in response to the compensation control signal.

In an embodiment, the logo determiner may include a pattern comparator which generates the second determination data through pattern matching between the first logo map and the second logo map.

In an embodiment, the pattern comparator may compare data for respective coordinates of the first logo map and the second logo map, and may detect the number of pixels in which the data of the first logo map and the second logo map do not match with each other at the respective coordinates to generate the second determination data.

In an embodiment, the logo determiner may further include: a boundary setter which sets a partial area positioned around an edge of the logo area as a boundary area and generates boundary area data including information on the boundary area; and a calculator which generates the first determination data by counting the number of pixels positioned in an area where a first area corresponding to a first image recognized as the logo image and the boundary area overlap each other, based on the boundary area data.

In an embodiment, the logo determiner may further include an error determiner which generates the compensation control signal based on the first determination data and the second determination data.

In an embodiment, the error determiner may compare the first determination data with a first threshold to determine whether the second logo map includes the error, and may compare the second determination data with a second threshold to determine whether the logo images in the first logo map and the second logo map match with each other.

In an embodiment, the error determiner, when it is determined that the logo images in the first logo map and the second logo map match with each other, may generate a first compensation control signal.

In an embodiment, the luminance compensation block may include a compensation determiner which outputs first logo map data and compensation data corresponding to the first logo map in response to the first compensation control signal; and a luminance compensator which converts the input image signal of the next frame based on the first logo map data and the compensation data to generate the image data.

In an embodiment, the error determiner, when it is determined that the logo images in the first logo map and the second logo map do not match with each other and the second logo map includes the error, may generate a second compensation control signal.

In an embodiment, the luminance compensation block may include a compensation determiner which outputs a map control signal for initializing the second logo map to the logo map generator in response to the second compensation control signal.

In an embodiment, the error determiner, when it is determined that the logo images in the first logo map and the second logo map do not match with each other and the second logo map does not include the error, may generate a third compensation control signal.

In an embodiment, the luminance compensation block may include a compensation determiner which outputs second logo map data and compensation data corresponding to the second logo map in response to the third compensation control signal; and a luminance compensator which converts the input image signal of the next frame based on the second logo map data and the compensation data to generate the image data.

Another embodiment of the invention provides a driving method of a display device which detects a logo image and a logo area including the logo image from an input image signal of each frame to compensate for luminance of the logo image. In such an embodiment, the driving method of the display device includes: generating a first logo map based on an input image signal of an N-th frame, where N is a natural number; generating a second logo map based on an input image signal of an (N+1)-th frame; and selectively changing luminance of a logo image of an (N+2)-th frame by determining a similarity between the first logo map and the second logo map.

In an embodiment, when it is determined that the logo images in the first logo map and the second logo map match with each other based on a result of determining the similarity between the first logo map and the second logo map, the luminance of the logo image of the (N+2)-th frame may be compensated based on the first logo map.

In an embodiment, the driving method of the display device may further include: setting an edge area of the logo area as a boundary area; determining whether the second logo map includes an error based on boundary area data for the boundary area, where when it is determined that the logo images in the first logo map and the second logo map do not match with each other and the second logo map includes the error, compensation data for the logo image may be initialized.

In an embodiment, the driving method of the display device may further include: setting an edge area of the logo area as a boundary area; determining whether the second logo map includes an error based on boundary area data for the boundary area, where when it is determined that the logo images in the first logo map and the second logo map do not match with each other and the second logo map does not include the error, the luminance of the logo image of the (N+2)-th frame may be compensated based on the second logo map.

In embodiments of the display device and the driving method thereof according to the invention, a similarity between a logo map of a previous frame and a logo map of a current frame and/or an error of the logo map of the current frame may be determined, and luminance of a logo image may be more accurately and efficiently compensated based on a result of such determination. Accordingly, in such embodiments, an afterimage caused by continuously displaying a specific image such as a logo image may be effectively prevented, and image quality of a display device may be thereby improved.

BRIEF DESCRIPTION OF THE DRAWINGS

FIG. 10A to FIG. 10D illustrate embodiments of a second logo map corresponding to a current frame.

DETAILED DESCRIPTION

Figure 1:
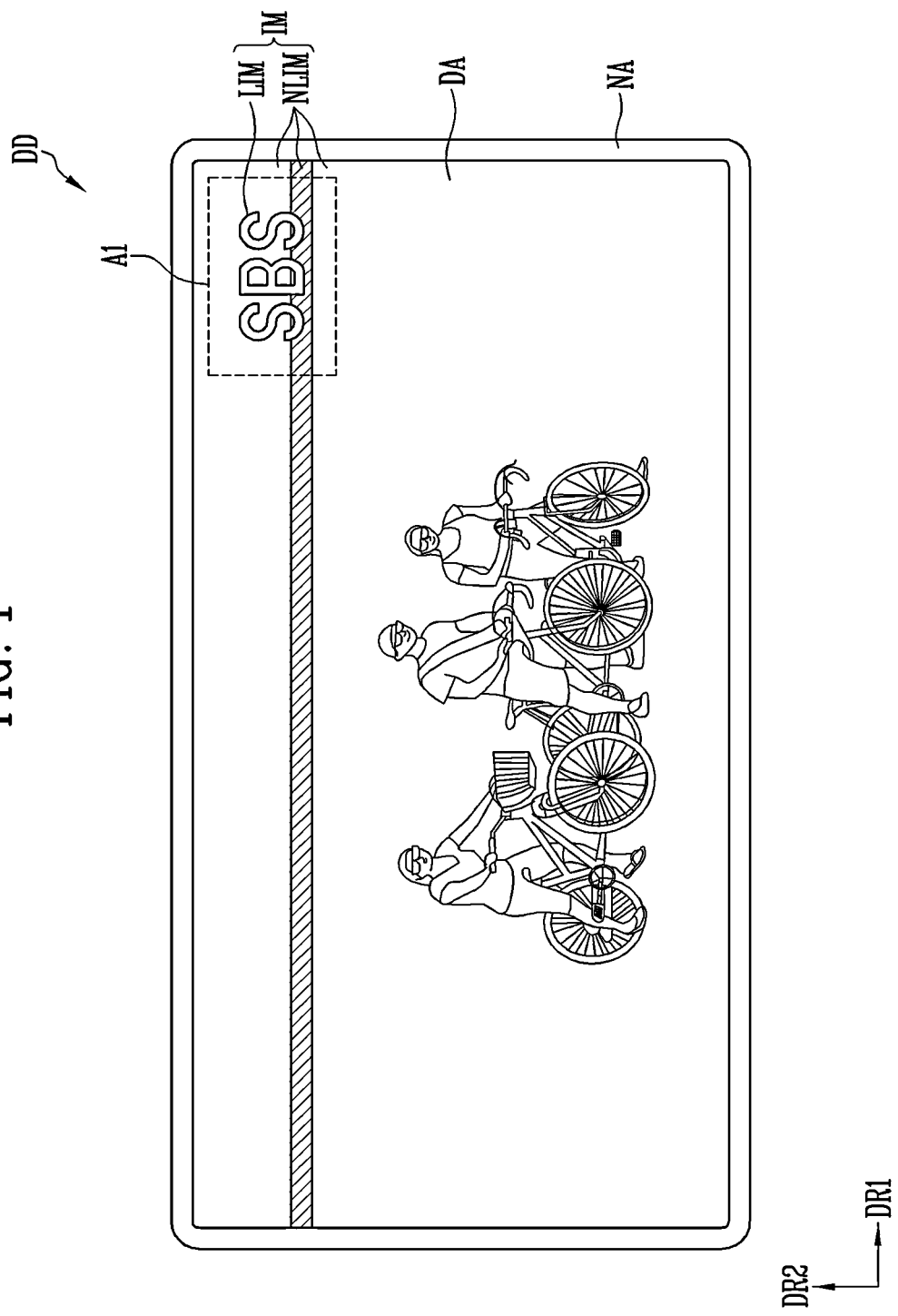
FIG. 1 illustrates a top plan view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 illustrates a top plan view of a display device DD according to an embodiment of the invention.

Referring to FIG. 1, an embodiment of a display device DD includes a display area DA in which an image IM is displayed, and a non-display area NA disposed around the display area DA. The non-display area NA is an remaining area excluding the display area DA, and wires, pads, and/or an internal circuit that are connected to pixels of the display area DA may be disposed in the non-display area NA.

The display device DD may have one of various shapes. In one embodiment, for example, the display device DD may be in a rectangular plate shape, but is not limited thereto. In one alternative embodiment, for example, the display device DD may have another shape such as a circle or an ellipse. In an embodiment, the display device DD may include a right angled corner and/or curved line corner. For convenience of illustration and description, FIG. 1 illustrates an embodiment where the display device DD has a rectangular plate shape and includes a curved line corner. In addition, in FIG. 1, an extending direction of a long side (for example, horizontal direction) of the display device DD is indicated as a first direction DR1, and an extending direction of a short side (for example, vertical direction) is indicated as a second direction DR2.

The display area DA may have one of various shapes. In one embodiment, for example, the display area DA may have one of various shapes including a rectangular shape, a circular shape, or an elliptical shape. In an embodiment, the display area DA may have a shape corresponding to that of the display device DD, but is not limited thereto.

The display area DA includes pixels, and the image IM may be displayed in the display area DA based on the pixels. In an embodiment, the image IM may include a logo image LIM and a non-logo image NLIM.

The logo image LIM may be a still image in which an image of a specific gray and/or pattern is displayed in a fixed area for a predetermined time or longer. In one embodiment, for example, the logo image LIM may include a broadcaster logo, subtitles, date, time, and the like. The logo image LIM may also include a title of a program. Herein, all of various types of images displayed in a fixed area for a predetermined time or longer in a specific gray and/or pattern will be referred to as the logo images LIM.

The non-logo image NLIM may be an image displayed in the display area DA excluding the logo image LIM. The non-logo image NLIM may be a motion picture or a still image.

Figure 2:
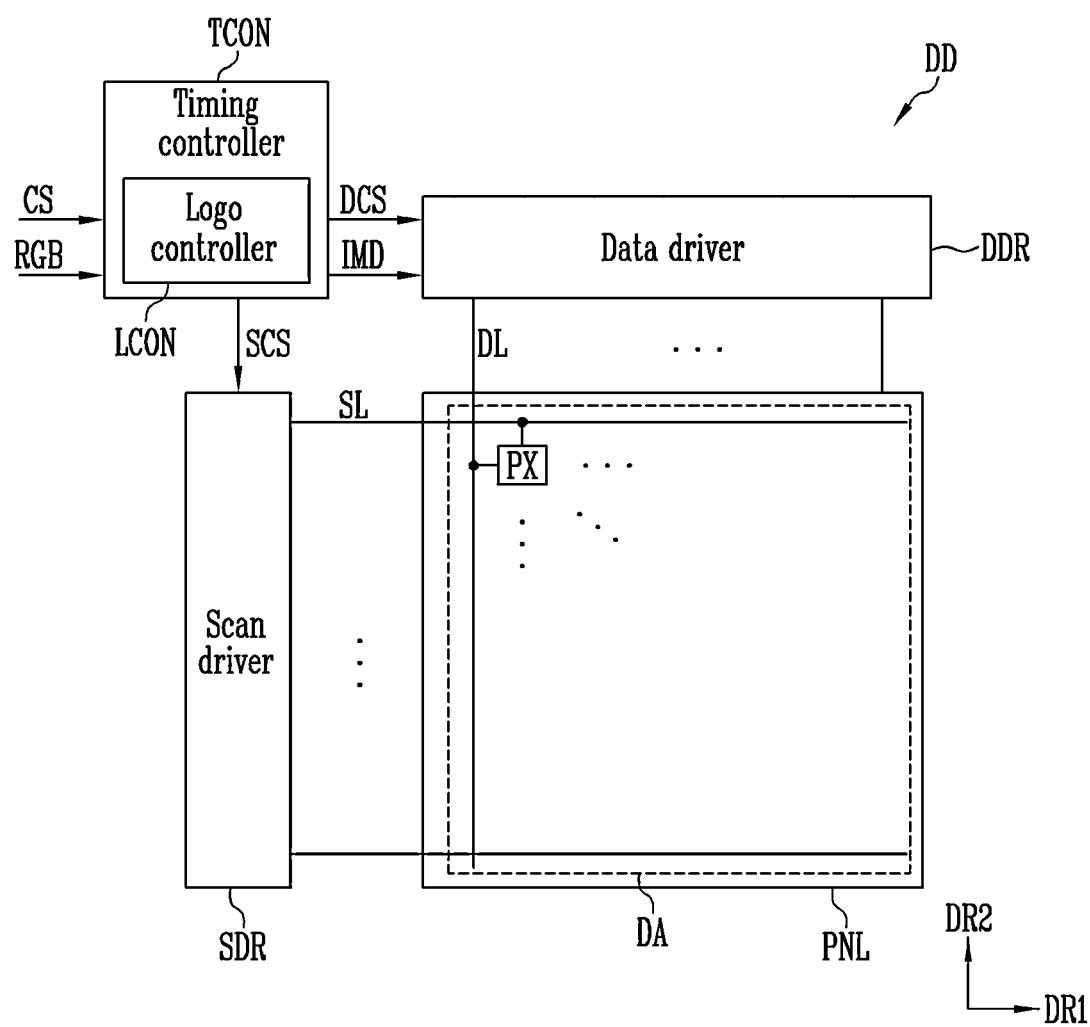
FIG. 2 illustrates a block diagram of a display device according to an embodiment of the invention.

FIG. 2 illustrates a block diagram of the display device DD according to an embodiment of the invention.

Referring to FIG. 1 and FIG. 2, an embodiment of the display device DD according to the invention includes a display panel PNL including pixels PX, a scan driver SDR and a data driver DDR for driving the pixels PX, and a timing controller TCON for controlling the scan driver SDR and the data driver DDR. In FIG. 2, the display panel PNL, the scan driver SDR, the data driver DDR, and the timing controller TCON are shown as separate constituent elements, but the invention is not limited thereto. In one embodiment, for example, the display panel PNL, the scan driver SDR, the data driver DDR, and/or the timing controller TCON may be integrated into a single panel and/or driving integrated circuit ("IC") chip.

In an embodiment, the display device DD further includes a logo controller LCON. The logo controller LCON may be included or provided in the timing controller TCON, but is not limited thereto. In one embodiment, for example, the logo controller LCON may be separately configured, e.g., in a separate chip, from the timing controller TCON.

The display panel PNL includes the display area DA. The display area DA includes scan lines SL and data lines DL, and the pixels PX connected to the scan lines SL and the data lines DL. Herein, the term "connection" may comprehensively mean an electrical connection and/or a physical connection.

The scan lines SL connect the scan driver SDR and the pixels PX. Accordingly, scan signals outputted from the scan driver SDR are transmitted to the pixels PX through the scan lines SL. Timing (for example, a data programming period) at which respective data signals are inputted to the pixels PX may be controlled by the scan signals.

The data lines DL is connected between the data driver DDR and the pixels PX. Accordingly, data signals outputted from the data driver DDR are transmitted to the pixels PX through the data lines DL. Emission luminance of the pixels PX during respective frames may be individually controlled by the data signals.

The pixels PX may be arranged in the display area DA based on a predetermined arrangement and/or shape. In one embodiment, for example, the pixels PX may be disposed in a matrix format along the first direction DR1 and the second direction DR2 within the display area DA. However, the arrangement form of the pixels PX may be variously changed or modified.

Each pixel PX is connected to at least one scan line SL and data line DL. In one embodiment, for example, a pixel PXij arranged in an i-th pixel row (also referred to as a "i-th horizontal line") and a j-th pixel column (also referred to as a "j-th vertical line") of the display area DA may be connected to an i-th scan line and a j-th data line.

When a scan signal is supplied from each scan line SL, the pixels PX may receive a data signal through the data lines DL. In addition, the pixels PX may receive at least one driving power source (for example, a first power source as a high-potential pixel power source, and a second power source as a low-potential pixel power source).

The pixels PX may emit light with luminance corresponding to corresponding data signals during light emitting period of each frame. However, a pixel that is supplied with a black data signal to a specific frame may substantially maintain a non-light emitting state during a light emitting period of a corresponding frame.

In an embodiment, the pixels PX may be self-light emitting type pixels, each including a light emitting element. However, the invention is not limited thereto, and the type, structure, and/or driving method of the pixels PX may be variously modified.

The scan driver SDR receives a first control signal SCS from the timing controller TCON, and supplies the scan signal to the scan lines SL in response to the first control signal SCS. In one embodiment, for example, the scan driver SDR may receive the first control signal SCS including a scan start signal (for example, a sampling pulse inputted to a first scan stage) and a scan clock signal, and sequentially output the scan signal to the scan lines SL in response thereto. The pixels PX selected by respective scan signals may receive the data signals of a corresponding frame from the data lines DL.

The data driver DDR receives a second control signal DCS and image data IMD from the timing controller TCON, and generates data signals in response to the second control signal DCS and the image data IMD. In one embodiment, for example, the data driver DDR may receive the image data IMD along with the second control signal DCS that includes a source sampling pulse, a source sampling clock, and a source output enable signal, and generate the data signals based on to the image data IMD. In an embodiment, the data signals may be generated in a form of a data voltage corresponding to luminance to be displayed in the pixels PX.

The data driver DDR may supply respective data signals to the pixels PX through the data lines DL. In one embodiment, for example, the data driver DDR may output the data signals corresponding to the pixels PX selected in a corresponding horizontal period to the data lines DL for each horizontal period. The data signals outputted to the data lines DL may be supplied to the pixels PX selected by the scan signal.

The timing controller TCON receives control signals CS and an input image signal RGB from an outside (for example, a host processor), and controls operations of the scan driver SDR and the data driver DDR in response to the control signals CS and the input image signal RGB.

In one embodiment, for example, the timing controller TCON may receive the control signals CS including timing signals such as a vertical synchronization signal, a horizontal synchronization signal, and a main clock signal, and may generate the first and second control signals SCS and DCS in response to the control signals CS. The first control signal SCS may be supplied to the scan driver SDR, and the second control signal DCS may be supplied to the data driver DDR.

In an embodiment, the timing controller TCON generates the image data IMD of each frame based on the input image signal RGB corresponding to the image to be displayed in each frame, and supplies the image data IMD to the data driver DDR. In one embodiment, for example, the timing controller TCON may generate the image data IMD by converting the data format of the input image signal RGB to satisfy a specifications of an interface with the data driver DDR.

In an embodiment of the invention, the timing controller TCON may include the logo controller LCON for controlling the luminance of the logo image LIM.

The logo controller LCON controls the luminance of the logo image LIM by detecting the logo image LIM and a logo area including the logo image LIM from the input image signal RGB of each frame (or, the input image signal RGB accumulated for a plurality of frames). In one embodiment, for example, the logo controller LCON may control the luminance of the logo image LIM to prevent or improve occurrence of an afterimage or deterioration in image quality due to deterioration of the pixels PX displaying the logo image LIM for a long time. In one embodiment, for example, the logo controller LCON may prevent or reduce deterioration of the pixels PX displaying the logo image LIM by selectively lowering the luminance of the logo image LIM based on a predetermined determination reference. Accordingly, a luminance deviation between the pixels PX provided in the display area DA may be compensated.

In an embodiment of the invention, the logo controller LCON generates the logo map of each frame based on the input image signal RGB of each frame. In such an embodiment, the logo controller LCON determines in real time whether the logo map includes an error based on logo map data included in each logo map, and compares the logo map of a previous frame with the logo map of a current frame to determine similarity therebetween.

The logo controller LCON selects whether to compensate for the luminance of the logo image LIM of a next frame and/or a logo map to be used for the luminance compensation, depending on whether the logo map of the current frame has error and/or on the similarity between the logo map of the previous frame and the logo map of the current frame. When compensating for the luminance of the logo image LIM, the logo controller LCON may generate the image data IMD by changing a gray of the input image signal RGB for the logo image LIM based on compensation data (for example, a luminance compensation value or target luminance) corresponding to the selected logo map. Accordingly, the luminance of the logo image LIM may be changed.

A configuration and operation of the logo controller LCON will be described later in greater detail with reference to FIG. 4 to FIG. 11.

Figure 3A:
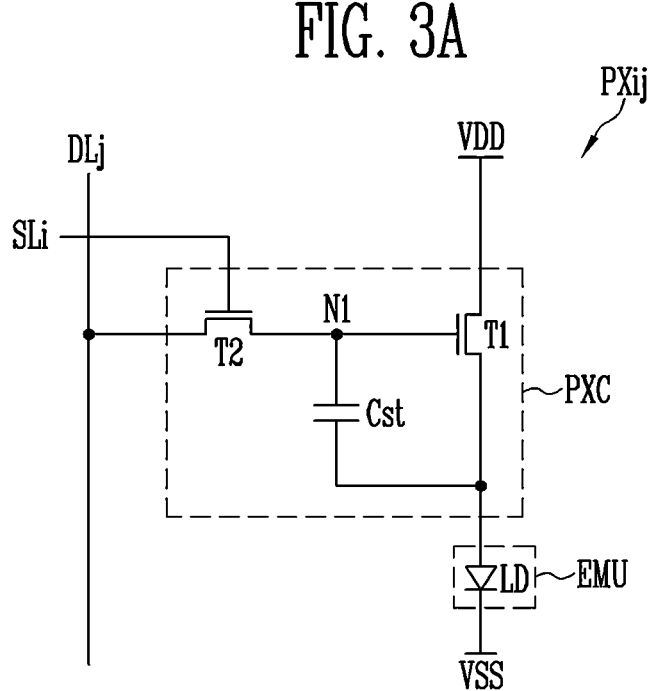
FIG. 3A and FIG. 3B respectively illustrate a circuit diagram of a pixel according to an embodiment of the invention.
Figure 3B:
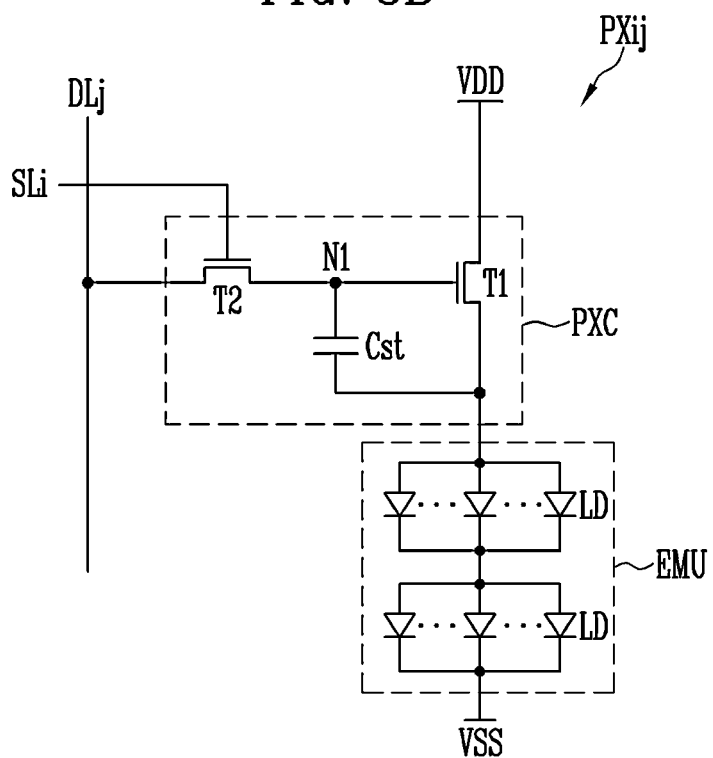

FIG. 3A and FIG. 3B respectively illustrate a circuit diagram of a pixel PXij according to an embodiment of the invention. In one embodiment, for example, FIG. 3A and FIG. 3B illustrate embodiments of a pixel PXij connected to an i-th scan line SLi and a j-th data line DLj among the pixels PX arranged in the display area DA of FIG. 2. Embodiments of FIG. 3A and FIG. 3B are substantially the same as each other except for a light emitting part EMU. In an embodiment, the pixels PX disposed in the display area DA may have a substantially similar or same structure as that of the pixel PXij shown in FIG. 3A and FIG. 3B. FIG. 3A and FIG. 3B illustrate embodiments where the pixel PXij is a self-light emitting type pixel that may be provided in a self-light emitting type display device, but the invention is not limited thereto.

Referring to FIG. 1 to FIG. 3B, an embodiment of the pixel PXij includes the light emitting prat EMU including at least one light emitting element LD connected between a first power source VDD and a second power source VSS. In such an embodiment, the pixel PXij may further include a pixel circuit PXC for controlling and/or driving the light emitting part EMU.

In an embodiment, the pixel circuit PXC may be connected between a first power source VDD and the light emitting part EMU. In such an embodiment, the pixel circuit PXC may be connected to the scan line SLi and the data line DL of the corresponding pixel PXij to control an operation of the light emitting part EMU in response to a scan signal and a data signal supplied from the scan line SLi and the data line DLi during each frame period. The pixel circuit PXC may have another structure different from the structures shown in FIG. 3A and FIG. 3B, and may be further selectively connected to at least one control line and/or a third power source. In one embodiment, for example, the pixel circuit PXC may be further connected to an initialization control line, a sensing signal line, a sensing line, and/or an initialization power source.

The pixel circuit PXC may include at least one transistor and a capacitor. In one embodiment, for example, the pixel circuit PXC may include a first transistor T1, a second transistor T2, and a capacitor Cst, as shown in FIG. 3A and FIG. 3B.

In such an embodiment, the first transistor T1 is connected between the first power source VDD and a first electrode of the light emitting part EMU (for example, an anode electrode of the at least one light emitting element LD). In such an embodiment, a gate electrode of the first transistor T1 is connected to a first node N1. The first transistor T1 controls a driving current supplied to the light emitting part EMU in response to a voltage of the first node N1. In such an embodiment, the first transistor T1 may be a driving transistor that controls a driving current of the pixel PXij.

The second transistor T2 is connected between the data line DLj and the first node N1. In such an embodiment, a gate electrode of the second transistor T2 is connected to the scan line SLi. When a scan signal of a gate-on voltage (for example, a high level voltage) is supplied from the scan line SLi, the second transistor T2 is turned on to electrically connect the data line DLj and the first node N1.

For each frame period, a data signal of the corresponding frame is supplied to the data line DLj, and the data signal is transmitted to the first node N1 through the turned-on second transistor T2 during a period in which the scan signal of the gate-on voltage is supplied. In such an embodiment, the second transistor T2 may be a switching transistor for transmitting each data signal to the inside of the pixel PXij.

One electrode of the capacitor Cst is connected to the first node N1, and the other electrode thereof is connected to a second electrode of the first transistor T1. The capacitor Cst is charged with a voltage corresponding to the data signal supplied to the first node N1 during each frame period.

FIG. 3A and FIG. 3B illustrates embodiments where the transistors included in the pixel circuit PXC, for example, the first and second transistors T1 and T2 are N-type transistors, but the invention is not limited thereto. Alternatively, at least one of the first and second transistors T1 and T2 may be an P-type transistor. In one embodiment, for example, the pixel circuit PXC may include only P-type transistors, or may complexly include P-type and N-type transistors.

In an embodiment, the structure and driving method of the pixel PXij may be variously modified. In one embodiment, for example, the pixel circuit PXC may be configured as a pixel circuit having one of various structures and/or that operates based on one of various driving methods other than those of the embodiments shown in FIG. 3A and FIG. 3B.

In one embodiment, for example, the pixel circuit PXC may further include at least one circuit element such as a sensing transistor for sensing characteristic information of the pixel PXij in addition to a threshold voltage of the first transistor T1, a compensation transistor for diode-connecting the first transistor T1 during a predetermined compensation period to compensate for the threshold voltage of the first transistor T1, an initialization transistor for initializing the voltages of the first node N1 and/or the first electrode of the light emitting part EMU, a light emitting control transistor for controlling the light emitting period of the light emitting part EMU, and/or a boosting capacitor for boosting the voltage of the first node N1.

In an alternative embodiment, where the pixel PXij is a pixel of a passive light emitting display device, the pixel circuit PXC may be omitted. In such an embodiment, the light emitting part EMU may be directly connected to the scan line SLi, the data line DLj, a first power line supplied with the first power source VDD, a second power line supplied with the second power source VSS, and/or another signal line or power line.

The light emitting part EMU may include at least one light emitting element LD connected in a forward direction between the first power source VDD and the second power source VSS. In one embodiment, for example, the light emitting part EMU may include a single light emitting element LD connected in a forward direction or in series between the pixel circuit PXC and the second power source VSS as shown in FIG. 3A. One electrode (for example, an anode electrode) of the light emitting element LD may be connected to the first power source VDD through the pixel circuit PXC, and the other electrode (for example, the cathode electrode) of the light emitting element LD may be connected to the second power source VSS.

The first power source VDD and the second power source VSS may have different potentials so that the light emitting element LD may emit light. In one embodiment, for example, the first power source VDD may be set as a high-potential pixel power source, and the second power source VSS may be set as a low-potential pixel power source having a potential lower than a threshold voltage of the light emitting element LD compared with the potential of the first power source VDD.

When a driving current is supplied from the pixel circuit PXC, the light emitting element LD generates light with luminance corresponding to the driving current. Accordingly, the pixel PXij emits light with luminance corresponding to the data signal supplied to the first node N1 during each frame period. In an embodiment, when a data signal corresponding to a black gray is supplied to the first node N1 during a corresponding frame period, the pixel circuit PXC does not supply the driving current to the light emitting element LD, and accordingly, the pixel PXij may be maintained at a non-light emitting state during the corresponding frame period.

Referring to FIG. 3B, in an alternative embodiment, the light emitting part EMU may include a plurality of light emitting elements LD that are connected in a forward direction between the first power source VDD and the second power source VSS. In one embodiment, for example, the light emitting part EMU may include a plurality of light emitting elements LD that are connected in series and in parallel between the pixel circuit PXC and the second power source VSS.

In such an embodiment, the connection structure between the light emitting elements LD may be variously modified. In one alternative embodiment, for example, the light emitting elements LD may be connected to each other only in series or only in parallel.

In an embodiment, each light emitting element LD may be a light emitting diode including an organic or inorganic emission layer. In one embodiment, for example, the light emitting element LD may be an organic light emitting diode or a nitride-based inorganic light emitting diode, but is not limited thereto.

In embodiments of the invention, the type, structure, shape, size, number, and/or connection structure of the light emitting elements LD are not particularly limited, and may be variously modified.

Figure 4:
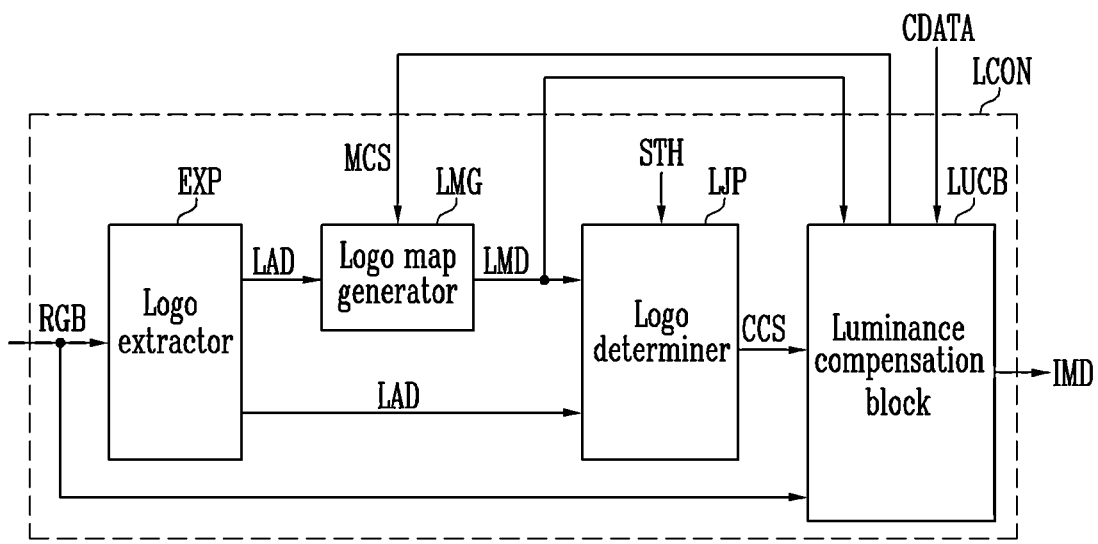
FIG. 4 illustrates a block diagram of a logo controller according to an embodiment of the invention.
Figure 5:
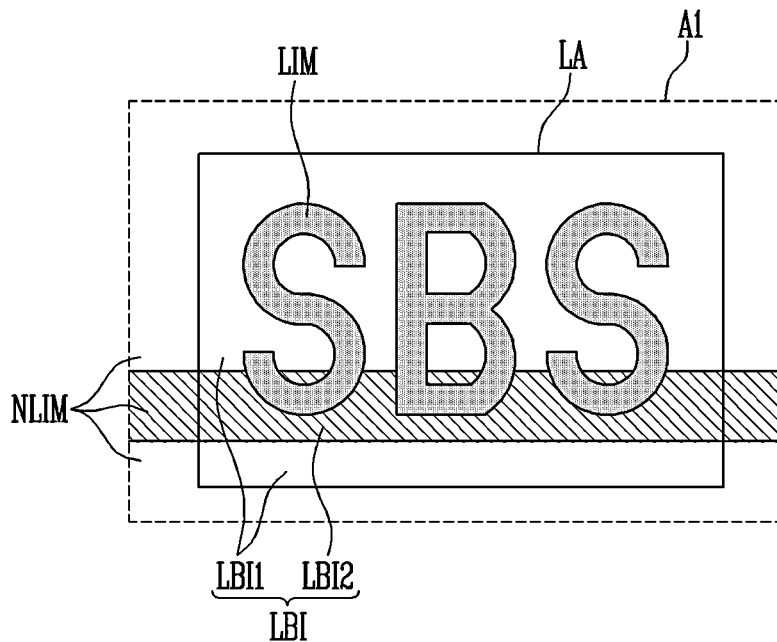
FIG. 5 illustrates a top plan view in which an area A1 including the logo image of FIG. 1 is enlarged.
Figure 6:
FIG. 6 illustrates an embodiment of a logo map generated by the logo map generator of FIG. 4.

FIG. 4 illustrates a block diagram of a logo controller LCON according to an embodiment of the invention. FIG. 5 illustrates a top plan view in which an area A1 including the logo image LIM of FIG. 1 is enlarged. FIG. 6 illustrates an embodiment of a logo map LM generated by the logo map generator LMG of FIG. 4.

Referring to FIG. 1 to FIG. 6, an embodiment of the logo controller LCON includes a logo extractor EXP, a logo map generator LMG, a logo determiner LJP, and a luminance compensation block LUCB.

The logo extractor EXP detects the logo image LIM to be displayed (or to be displayed) in the display area DA from the input image signal RGB of each frame and an logo area LA including the logo image LIM, and extracts a logo area data LAD for the logo area LA. The logo area LA may include an area in which the logo image LIM is displayed, and an area in which a logo background image LBI around the logo image LIM is displayed. The logo area data LAD may include data of the logo image LIM and data of the logo background image LBI within the logo area LA.

In an embodiment, the logo extractor EXP may include an artificial intelligence program that performs machine learning to detect the logo area LA. In one embodiment, for example, the logo extractor EXP may extract the logo area LA by using machine learning based on a convolutional neural network model or the like. In an embodiment, the logo extractor EXP may extract the logo area LA by using an artificial intelligence program that performs deep learning as well as machine learning.

In an embodiment, the logo extractor EXP may extract the logo area LA by analyzing the image IM displayed for a predetermined time. In an embodiment, the logo extractor EXP may extract the logo area LA by analyzing frames of the image IM that are repeated at a specific time point.

FIG. 5 illustrates the logo area LA extracted through the logo extractor EXP. In one embodiment, for example, the logo image LIM displayed as "SBS" and the logo background image LBI displayed as a background LBI1 around the "SBS" and a specific pattern LBI2 at a lower end portion of the "SBS" (for example, a horizontal line pattern) may be displayed in the logo area LA. In such an embodiment, the background LBI1 around the "SBS" may be an image having a large difference in gray (or grayscale level) when compared with the logo image LIM, and when compared with the logo image LIM, the specific pattern LBI2 at the lower end portion of the "SBS" may be an image having a same gray or a similar gray having a gray difference within a predetermined range.

The logo map generator LMG receives the logo area data LAD of each frame from the logo extractor EXP. The logo map generator LMG generates the logo map LM of each frame based on (or by using) the logo area data LAD. In one embodiment, for example, the logo map generator LMG may generate the logo map LM (also referred to as a "first logo map") of an N-th (N is a natural number) frame based on the input image signal RGB of the N-th frame (particularly, an image signal corresponding to the logo area LA of the N-th frame), and may generate the logo map LM (also referred to as a "second logo map") of an (N+1)-th frame based on the input image signal RGB of the (N+1)-th frame (particularly, an image signal corresponding to the logo area LA of the (N+1)-th frame).

FIG. 6 illustrates an embodiment of the logo map LM generated by the logo map generator LMG. In the logo map LM, the logo area LA may be segmented into a first area AR1 corresponding to a first image IM1 and a second area AR2 corresponding to a second image IM2. The first image IM1 may be an image recognized as the logo image LIM among the images of the logo area LA, and the second image IM2 may be the remaining image among the images of the logo area LA, that is, an image recognized as the logo background image LBI.

In an embodiment, the logo map generator LMG may calculate logo map data LMD including first data corresponding to the logo image LIM and second data corresponding to the logo background image LBI, based on the logo area data LAD of each frame. In such an embodiment, the logo map generator LMG may generate the logo map LM by segmenting the logo area LA into the first area AR1 corresponding to the first image IM1 and the second area AR2 corresponding to the second image IM2.

In an embodiment, the logo map generator LMG may segment the logo area LA through a binarization method. In one embodiment, for example, the logo map generator LMG may segment the logo area LA by using an Otsu's method.

In an embodiment, the logo map generator LMG generates a histogram for the gray of the logo area data LAD, and then may set a predetermined threshold (for example, a reference gray) for classifying the logo image LIM and the non-logo image NLIM based on the histogram. In such an embodiment, by segmenting the logo area LA into the first area AR1 corresponding to the first image IM1 recognized (or determined) as the logo image LIM and the second area AR2 corresponding to the second image IM2 recognized as the logo background image LBI based on the threshold, the logo map LM including the first image IM1 and the second image IM2 may be generated.

The logo map generator LMG may calculate the logo map data LMD corresponding to the logo map LM. In one embodiment, for example, the logo map generator LMG may calculate the logo map data LMD including the first data corresponding to the first image IM1 and the second data corresponding to the second image IM2 based on the logo area data LAD.

In an embodiment, the first data corresponding to the first image IM1 may be determined as a binary number "1", and the second data corresponding to the second image IM2 may be determined as a binary number "0". In an embodiment, as shown in FIG. 6, an area determined as a binary number "1" may be classified as the first area AR1, and an area determined as a binary number "0" may be classified as the second area AR2.

Referring to FIG. 5 and FIG. 6, in an embodiment, the logo background image LBI having a same or similar gray as the logo image LIM may be disposed around the logo image LIM. In such an embodiment, the logo map generator LMG may recognize a portion of the logo background image LBI as the logo image LM, so that it may generate the logo map LM including an error. In one embodiment, for example, when the specific pattern LBI2 that is displayed at the lower end portion of the "SBS" corresponding to the logo image LIM and has the same or similar gray as the logo image LM is positioned, the logo map generator LMG may recognize not only the "SBS", which is an actual logo image LIM, but also the specific pattern LBI2 at the lower end portion of the "SBS", which is a portion of the logo background image LBI, as the logo image LIM to segment them into the first area AR1, and may recognize the remaining area of the logo area LA excluding the first area AR1 as the logo background image LBI to segment it into the second area AR2.

Accordingly, the logo map generator LMG calculates the logo map data LMD including the first data as in the logo image LIM fora portion of the logo background image LBI, as well as the logo image LIM. Therefore, when luminance of the logo image LIM is changed based on the logo map data LMD (for example, when the luminance is lowered to a predetermined target luminance), the luminance is also changed for a portion of the logo background image LBI, so that accuracy of logo compensation may be lowered and image quality may deteriorate.

In an embodiment of the invention, the logo determiner LJP is configured to prevent the luminance of the logo background image LBI from being changed and to prevent the luminance of the logo image LIM from being suddenly and/or frequently changed by determining the error of the logo map LM described above in real time.

The logo determiner LJP receives the logo map data LMD of each frame from the logo map generator LMG. In an embodiment, the logo determiner LJP may receive or store a predetermined threshold STH for determining an error and/or similarity of the logo map LM. In such an embodiment, the logo determiner LJP may receive the logo area data LAD from the logo extractor EXP or the logo map generator LMG.

The logo determiner LJP determines an error in the logo map LM in real time based on the logo map data LMD and the threshold STH, and when it is determined that an error occurs in the logo map LM of a current frame, the logo determiner LJP compensates for luminance of the logo image LIM of a next frame based on the logo map of a previous frame, or initializes compensation data for the logo image LIM. Accordingly, by preventing a luminance change of the logo background image LBI due to an error of the logo map LM, accuracy of logo compensation may be increased and image quality may be improved.

In an embodiment, the logo determiner LJP compares the first logo map of the previous frame (for example, an N-th frame) and the second logo map of the current frame (for example, an (N+1)-th frame) to determine similarity therebetween, and when the first logo map and the second logo map are determined to have the similarity of the predetermined threshold STH or more, the logo determiner LJP compensates for the luminance of the logo image LIM of the next frame (for example, an (N+2)-th frame) based on the first logo map. In one embodiment, for example, the logo determiner LJP may determine whether the logo image LIM for the first logo map and the logo image LIM for the second logo map are matched with each other, and the logo determiner LJP may determine whether the luminance of the logo image LIM is compensated and/or a logo map to be used for the luminance compensation, according to the determined result. Accordingly, in such an embodiment, the luminance of the logo image LIM may be effectively prevented from being suddenly and/or frequently changed, and the efficiency of logo compensation may be increased.

The logo determiner LJP generates a compensation control signal CCS based on determination on whether the second logo map of the current frame includes an error and/or according to the similarity between the first logo map of the previous frame and the second logo map of the current frame. The compensation control signal CCS may be supplied to the luminance compensation block LUCB to be used to selectively compensate luminance for the logo image LIM.

The configuration and operation of the logo determiner LW will be described later in greater detail with reference to FIG. 7 to FIG. 11.

Referring back to FIG. 4, the luminance compensation block LUCB selectively compensates for luminance of the logo area LA in response to the compensation control signal CCS. The luminance compensation block LUCB may receive the input image signal RGB of each frame from the outside, and may receive the compensation control signal CCS from the logo determiner LW. In such an embodiment, the luminance compensation block LUCB may receive the logo map data LMD from the logo map generator LMG or the logo determiner LW, and may receive compensation data CDATA from the timing controller TCON.

In an embodiment, the luminance compensation block LUCB may output a map control signal MCS to the logo map generator LMG when a predetermined condition is satisfied. The map control signal MCS may be a signal for changing the second logo map generated based on the input image signal RGB of the current frame to the first logo map generated based on the input image signal RGB of the previous frame, or for initializing the logo map LM (for example, the second logo map), but is not limited thereto.

The timing controller TCON may generate the compensation data CDATA for compensating the luminance of the first area AR1 corresponding to the first image IM1 among the logo area LA with a preset target luminance, through histogram analysis for the gray of the logo area data LAD. In an embodiment, the compensation data CDATA may be determined based on the analysis of the image IM displayed for a predetermined time.

The luminance compensation block LUCB may compensate for the luminance of the logo area LA based on the logo map data LMD and the compensation data CDATA. In one embodiment, for example, the luminance compensation block LUCB may output the image data IMD including data in which the luminance of the first area AR1 of the logo area LA is compensated with a predetermined target luminance. The image data IMD outputted from the luminance compensation block LUCB may be inputted to the data driver DDR and then be used to generate a data signal. Accordingly, the luminance of the logo image LIM displayed in the display area DA may be controlled.

In embodiments of the invention, as described above, the logo controller LCON may generate the logo map LM of each frame based on the input image signal RGB of each frame, and may determine in real time whether the logo map LM includes an error based on the logo map data LMD included in each logo map LM. In such embodiments, the logo controller LCON may determine the similarity between the first logo map and the second logo map respectively generated from the input image signals RGB of the previous frame and the current frame, and may selectively change the luminance of the logo image LIM for the next frame according to the determined similarity.

In one embodiment, for example, when it is determined that the second logo map of the current frame includes an error, the logo controller LCON may control the luminance of the logo image LIM of the next frame based on the first logo map of the previous frame, or initialize the compensation data CDATA of the logo image LIM. In such an embodiment, when the similarity between the first logo map and the second logo map satisfies (e.g., is within) a range of the predetermined threshold STH, the logo controller LCON may compensate for the luminance of the logo image LIM of the next frame based on the first logo map, regardless of whether the second logo map includes an error.

According to embodiments described above, the luminance of the logo background image LBI is effectively prevented from be changed due to the error in the logo map LM, so that while increasing the accuracy of logo compensation, the luminance of the logo image LIM may be effectively prevented from being suddenly and/or frequently changed. Accordingly, an afterimage may be prevented or reduced, and image quality may be substantially improved.

Figure 7:
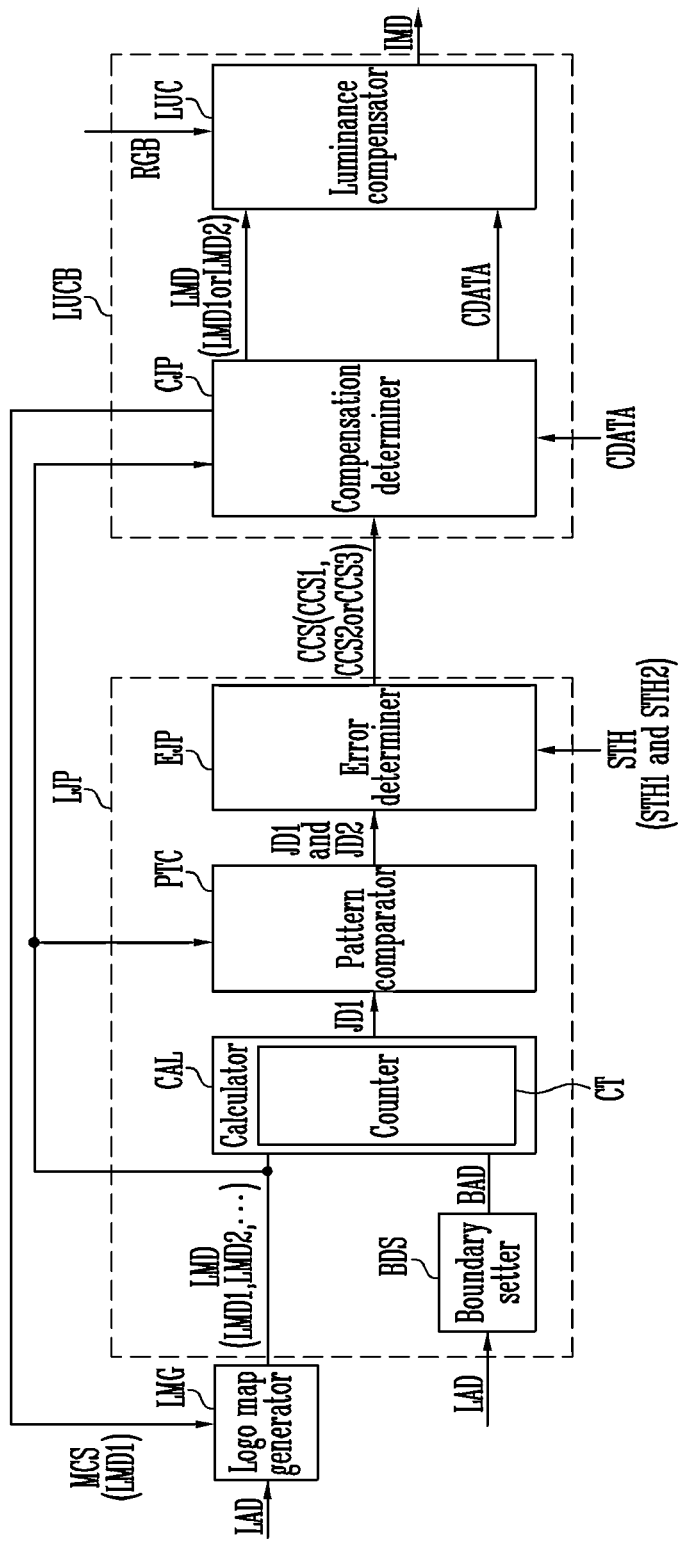
FIG. 7 illustrates a block diagram of the logo determiner and the luminance compensation block of FIG. 4.
Figure 8:
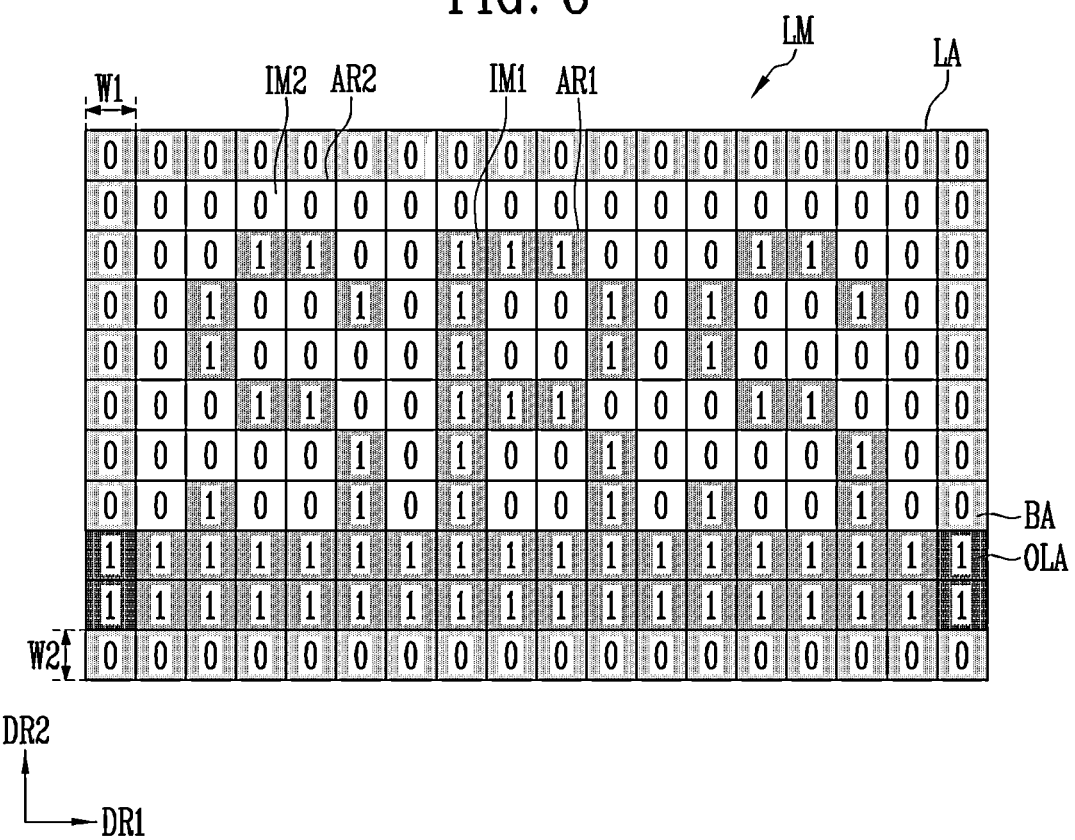
FIG. 8 illustrates a drawing for explaining operations of the boundary setter and the counter of FIG. 7.
Figure 9:
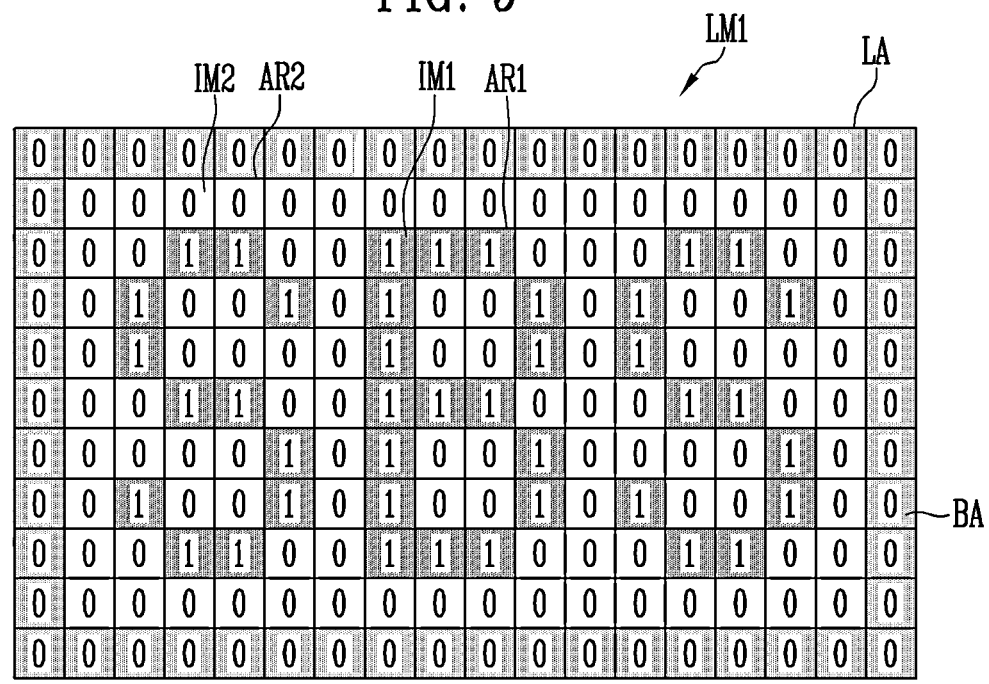
FIG. 9 illustrates an embodiment of a first logo map corresponding to a previous frame.

FIG. 7 illustrates a block diagram showing an embodiment of the logo determiner LUCB and the luminance compensation block LW of FIG. 4. FIG. 8 illustrates a drawing for explaining operations of a boundary setter and a counter of FIG. 7. Particularly, FIG. 8 illustrates an embodiment of a boundary area BA set for the logo map LM of FIG. 6. FIG. 9 illustrates an embodiment of the first logo map LM1 corresponding to a previous frame, and FIG. 10A to FIG. 10D illustrate embodiments of the second logo map LM2 corresponding to a current frame. Particularly, FIG. 9 illustrates an embodiment of the first logo map LM1 generated based on the input image signal RGB of an N-th frame, and FIG. 10A to FIG. 10D illustrate various embodiments of the second logo map LM2 generated based on the input image signal RGB of an (N+1)-th frame In an embodiment, referring to FIG. 1 to FIG. 7, the logo determiner LJP receives the logo area data LAD and the logo map data LMD of each frame, and generates the compensation control signal CCS based thereon. In one embodiment, for example, the logo determiner LJP may generate a first determination data JD1 based on the second logo map LM2, and may compare the second logo map LM2 with the first logo map LM1 to generate a second determination data JD2. Here, the first logo map LM1 may be the logo map LM of the previous frame generated based on the input image signal RGB of the previous frame (for example, the N-th frame), and the second logo map LM2 may be the logo map LM of the current frame generated based on the input image signal RGB of the current frame (for example, the (N+1)-th frame).

The logo determiner LJP may generate the compensation control signal CCS based on the first determination data JD1 and the second determination data JD2. The compensation control signal CCS may be supplied to the luminance compensation block LUCB to be used to selectively change and/or compensate the luminance of the logo image LIM.

The logo determiner LJP may include the boundary setter BDS and a calculator CAL for generating the first determination data JD1, and a pattern comparator PTC for generating the second determination data JD2. In addition, the logo determiner LJP may include an error determiner EJP for generating the compensation control signal CCS based on the first determination data JD1 and the second determination data JD2.

Referring to FIG. 1 to FIG. 8, the boundary setter BDS may receive the logo area data LAD from the logo extractor EXP (or logo map generator LMG). The boundary setter BDS sets a partial area in the logo area LA as the boundary area BA, and outputs boundary area data BAD including information on the set boundary area BA.

The boundary area BA may be defined around an edge of the logo area LA. In one embodiment, for example, when the logo area LA has a quadrangular shape with four sides, the boundary area BA is an outermost area adjacent to four sides of the logo area LA, and may be an edge area of a predetermined range (or size) defined inward from each side of the logo area LA. The boundary area BA may have a width corresponding to at least one pixel row and/or pixel column.

In an embodiment, the boundary area BA may have a width W1 corresponding to one pixel column along the first direction DR1 and a width W2 corresponding to one pixel row along the second direction DR2, as shown in FIG. 8. In an alternative embodiment, the boundary area BA may have a width corresponding to a plurality of pixel columns (for example, two to three pixel columns) along the first direction DR1, and/or a width corresponding to a plurality of pixel rows (for example, two to three pixel rows) along the second direction DR2.

The boundary area BA may be set to not overlap an area in which the logo image LIM is displayed in the logo area LA. However, the invention is not limited thereto, and the boundary area BA may be set in various shapes and/or ranges within the logo area LA.

An area in which the boundary area BA and the first area AR1 in which the first image IM1 is displayed overlap each other may be defined as an overlapping area OLA.

The calculator CAL may receive the boundary area data BAD from the boundary setter BDS, and may receive the logo map data LMD from the logo map generator LMG. The calculator CAL may calculate an overlapping value indicating a degree to which the first area AR1 in the logo area LA overlaps the boundary area BA, and may output the overlapping value as the first determination data JD1.

In one embodiment, for example, the calculator CAL may count the number of pixels PX corresponding to the overlap area OLA defined as the first area AR1 corresponding to the first image IM1 among the boundary areas BA, and may output the counted value as the first determination data JD1. In such an embodiment, the calculator CAL may include the counter CT for counting the number of pixels PX corresponding to the overlapping area OLA.

In such an embodiment, the boundary setter BDS and the calculator CAL may be used to generate the first determination data JD1 from the second logo map data LMD2 of the second logo map LM2.

Referring to FIG. 1 to FIG. 10D, the pattern comparator PTC receives the second logo map data LMD2 corresponding to the second logo map LM2 from the logo map generator LMG in real time. In such an embodiment, the pattern comparator PTC may store first logo map data LMD1 corresponding to the first logo map LM1 or may receive the first logo map data LMD1 from the outside.

The pattern comparator PTC compares the first logo map data LMD1 and the second logo map data LMD2, and accordingly, generates the second determination data JD2 representing the similarity between the first logo map LM1 and the second logo map LM2. In one embodiment, for example, the pattern comparator PTC may generate the second determination data JD2 through pattern matching between the first logo map LM1 and the second logo map LM2.

In an embodiment, the pattern comparator PTC may compare data with respect to respective coordinates of the first logo map LM1 and the second logo map LM2, and may generate the second determination data JD2 by counting the number of pixels PX in which data of the first logo map LM1 and the second logo map LM2 do not match at the corresponding coordinates. In an alternative embodiment, the pattern comparator PTC may compare data with respect to respective coordinates of the first logo map LM1 and the second logo map LM2, and may generate the second determination data JD2 by counting the number of pixels PX in which data of the first logo map LM1 and the second logo map LM2 match at the corresponding coordinates. In such an embodiment, the pattern comparator PTC may include a counter. In an embodiment, the pattern comparator PTC may generate the second determination data JD2 by using another method capable of calculating the similarity between the first logo map LM1 and the second logo map LM2.

The second determination data JD2 may include similarity information between the first logo map LM1 and the second logo map LM2. In one embodiment, for example, the second determination data JD2 may include the number (or ratio) of pixels PX in which data in the first logo map LM1 and the second logo map LM2 do not match, and/or the number (or ratio) of pixels PX in which data in the first logo map LM1 and the second logo map LM2 match.

The second determination data JD2 may be supplied to the error determiner EJP together with the first determination data JD1 generated by the calculator CAL. In an embodiment, the first determination data JD1 may be transmitted from the calculator CAL through the pattern comparator PTC to the error determiner EJP. In an alternative embodiment, the first determination data JD1 may be directly transmitted from the calculator CAL to the error determiner EJP.

The error determiner EJP generates the compensation control signal CCS based on the first determination data JD1 and the second determination data JD2. In one embodiment, for example, the error determiner EJP determines whether or not the second logo map LM2 includes an error based on the first determination data JD1, and determines whether the logo images LIM in the first logo map LM1 and the second logo map LM2 match with each other based on the second determination data JD2 (for example, whether the first areas AR1 match). In such an embodiment, the error determiner EJP may store a first threshold STH1 and/or a second threshold STH2, or may receive the first threshold STH1 and/or the second threshold value STH2 from the outside.

The error determiner EJP may compare the first determination data JD1 with the first threshold STH1 to determine whether the second logo map LM2 includes an error. In one embodiment, for example, where the first determination data JD1 is data corresponding to the number or ratio of the pixels PX corresponding to the first image IM1 among the pixels PX positioned in the boundary area BA, and the first threshold STH1 is the number (for example, a natural number larger than or equal to 1) or ratio of pixels that is previously set as a criterion for determining the error of the second logo map LM2, the error determiner EJP may determine that the second logo map LM2 includes an error when the first determination data JD1 is equal to or larger than the first threshold STH1. In one embodiment, for example, when the number of pixels PX corresponding to the overlapping area OLA is equal to or greater than a predetermined number, the error determiner EJP may determine that the second logo map LM2 includes an error.

The boundary area BA and the first threshold STH1 serve as a reference for determining an error of the logo map LM, and may be set in consideration of a statistical value. In one embodiment, for example, the logo extractor EXP may set the logo area LA in a predetermined range around the logo image LIM, and accordingly, the logo image LIM may be positioned at a center of the logo area LA, and thus a probability that the logo image LIM is positioned in the boundary area BA may be low. Therefore, when the first determination data JD1 is equal to or greater than the first threshold STH1, it may be determined that a probability that the second logo map LM2 generated in the current frame includes an error is high. Therefore, a range (or size) and the first threshold STH1 of the boundary area BA may be set to be able to be a criterion for determining an error with respect to the logo map LM (the second logo map LM2) of each frame, and the error of the second logo map LM2 may be detected and/or determined in real time based on the set boundary area BA and first threshold STH1.

In such an embodiment, the error determiner EJP may compare the second determination data JD2 with the predetermined second threshold value STH2 to determine whether the logo images LIM in the first logo map LM1 and the second logo map LM2 match with each other (for example, whether the first images IM1 respectively recognized as the logo image LIM in the previous frame and current frame match).

In an embodiment, where the second determination data JD2 is the number or ratio of pixels PX whose data in the first logo map LM1 and the second logo map LM2 do not match with each other, and the second threshold STH2 is the number (for example, a natural number of 1 or more) or ratio of inconsistent pixels set as a criterion for determining whether the logo images LIM in the first logo map LM1 and the second logo map LM2 match, the error determiner EJP may determine that the logo images LIM of the first logo map LM1 and the second logo map LM2 match with each other when the second determination data JD2 is equal to or less than the second threshold STH2. In one embodiment, for example, when in the pattern matching result for the first logo map LM1 and the second logo map LM2, the mismatched pixels is less than or equal to 20% (or a predetermined number corresponding thereto) of the entire pixels PX positioned in the logo area LA, the error determiner EJP may determine that the logo images LIM of the first logo map LM1 and the second logo map LM2 match with each other. In such an embodiment, when the above-mentioned condition is not satisfied, the error determiner EJP may determine that the logo images LIM of the first logo map LM1 and the second logo map LM2 do not match with each other.

In an alternative embodiment, where the second determination data JD2 is the number or ratio of pixels PX whose data in the first logo map LM1 and the second logo map LM2 match, and in the case in which the second threshold STH2 is the number (for example, a natural number of 1 or more) or ratio of matched pixels set as a criterion for determining whether the logo images LIM in the first logo map LM1 and the second logo map LM2 match, the error determiner EJP may determine that the logo images LIM of the first logo map LM1 and the second logo map LM2 match with each other when the second determination data JD2 is equal to or greater than the second threshold STH2. In such an embodiment, when the above-mentioned condition is not satisfied, the error determiner EJP may determine that the logo images LIM of the first logo map LM1 and the second logo map LM2 do not match with each other.

The error determiner EJP determines the similarity between the first logo map LM1 and the second logo map LM2 from the second determination data JD2, and accordingly, when it is determined that the logo images LIM of the first logo map LM1 and the second logo map LM2 match with each other, the error determiner EJP generates the compensation control signal CCS for compensating the luminance of the logo image LIM of the next frame (for example, N+2 frame) based on the first logo map LM1. In one embodiment, for example, when it is determined that the logo images LIM of the first logo map LM1 and the second logo map LM2 match with each other, the error determiner EJP may generate a first compensation control signal CCS1 to compensate for the luminance of the logo image LIM of the next frame based on the first logo map LM1, regardless of whether the second logo map LM2 includes an error.

Hereinafter, for convenience of description, an embodiment where only the image displayed as "SBS" in the first logo map LM1 of the previous frame is recognized as the first image IM1 corresponding to the logo image LIM will be described in detail with reference to FIG. 9. In such an embodiment, in the second logo map LM2 of the current frame, as shown in FIG. 10A to FIG. 10D, in addition to the image displayed as the "SBS", a specific pattern positioned at the lower end portion and/or peripheral portion of the "SBS" is recognized as the first image IM1 corresponding to the logo image LIM.

Figure 10A:
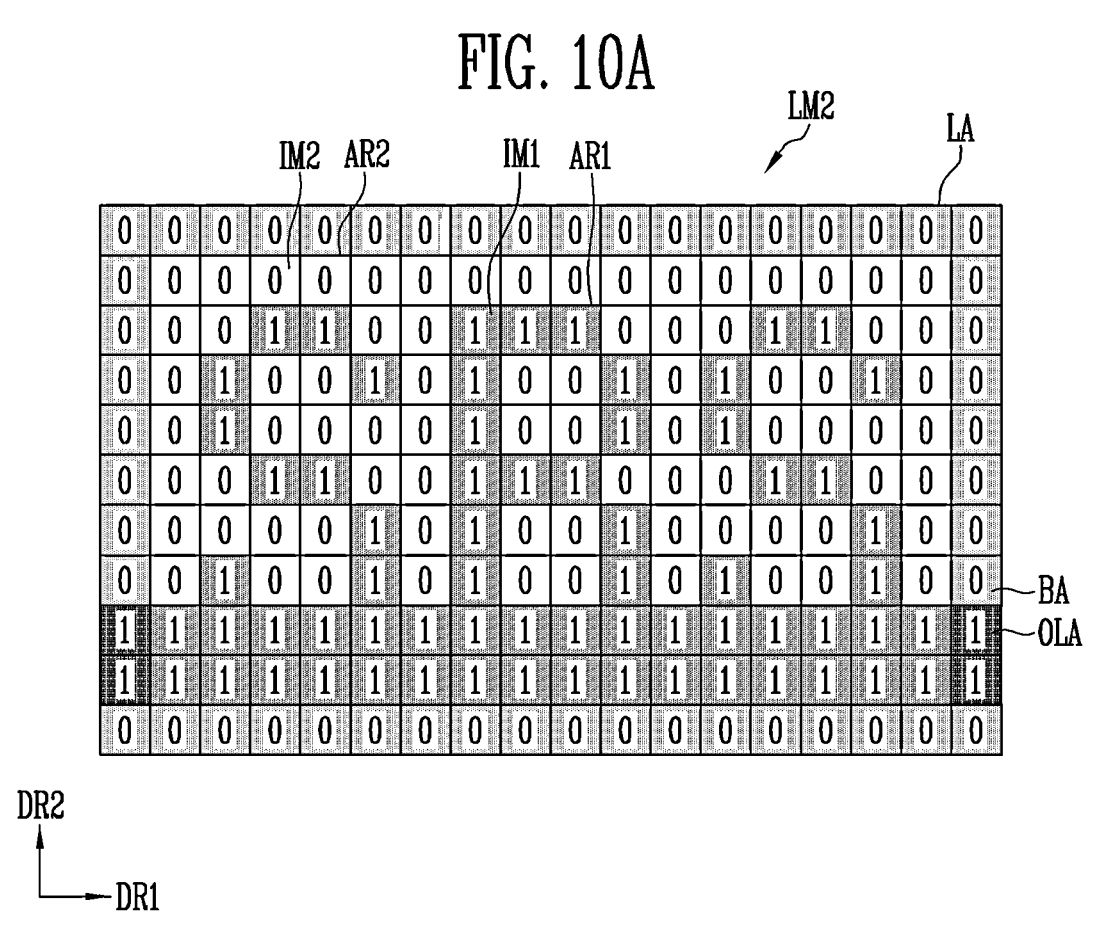

Referring to FIG. 9 and FIG. 10A, in the second logo map LM2, a pattern having the same or similar gray as the logo image LIM around the logo image LIM recognized as the first image IM1 in the first logo map LM1 may be entirely positioned in the boundary area BA, and the pattern may be recognized as the first image IM1 together with the logo image LIM. Accordingly, when the first determination data JD1 (for example, the number of pixels PX positioned in the overlapping area OLA) is greater than or equal to the first threshold STH1, the error determiner EJP may determine that the second logo map LM2 includes an error.

Figure 10B:
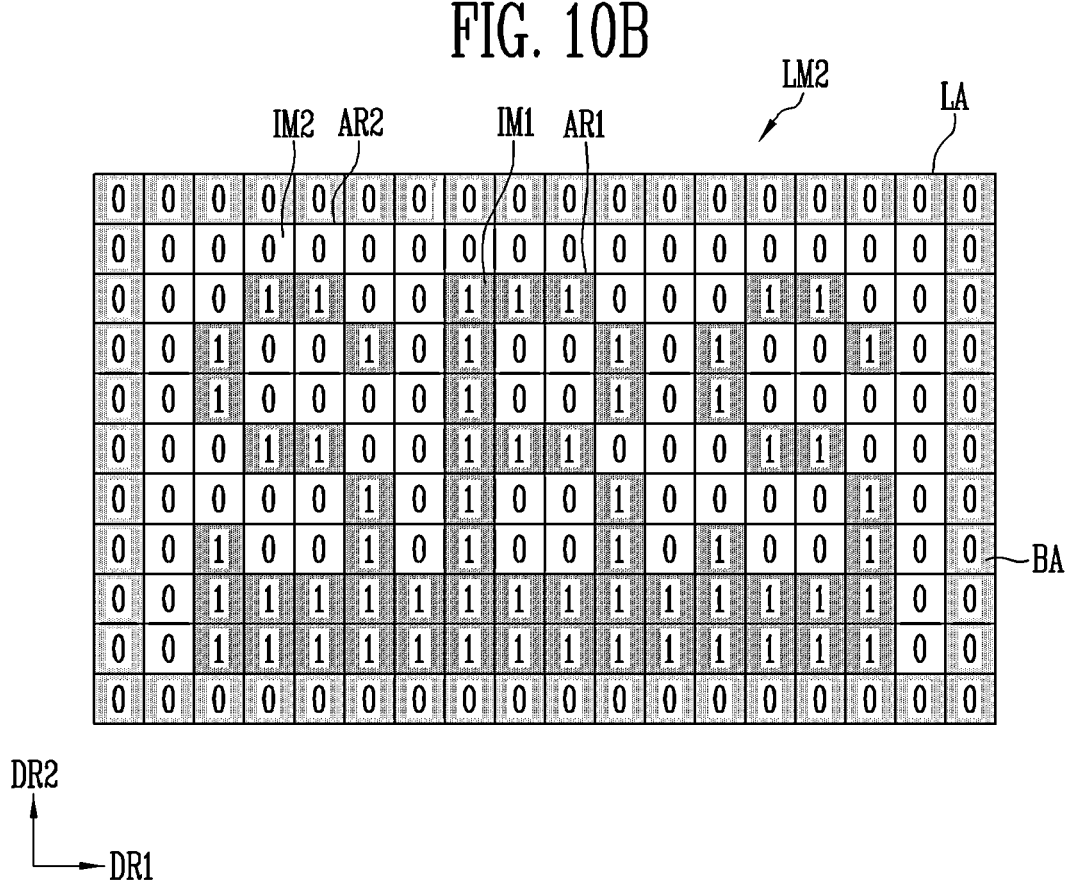

Referring to FIG. 9 and FIG. 10B, in the second logo map LM2, a pattern having the same or similar gray as the logo image LIM around the logo image LIM recognized as the first image IM1 in the first logo map LM1 may be positioned, and the pattern may be recognized as the first image IM1 together with the logo image LIM. However, the pattern may not be positioned in the boundary area BA, or may be partially positioned in the boundary area BA only by a relatively small area and/or ratio. Accordingly, when the first determination data JD1 is smaller than the first threshold STH1, the error determiner EJP may determine that the second logo map LM2 does not include an error.

In an embodiment, as shown in FIG. 10A and FIG. 10B, when an area of the first area AR1 corresponding to the pattern recognized as the first image IM1 in addition to the logo image LIM in the second logo map LM2 is relatively small, the second determination data JD2 (for example, the number of mismatched pixels) according to pattern matching between the first logo map LM1 and the second logo map LM2 may be equal to or less than the second threshold STH2. In such an embodiment, the error determiner EJP may determine that the logo images LIM of the first logo map LM1 and the second logo map LM2 match.

Accordingly, the error determiner EJP may generate the compensation control signal CCS based on the second determination data JD2 regardless of whether the second logo map LM2 includes an error. In one embodiment, for example, the error determiner EJP may output the first compensation control signal CCS1 for compensating for the luminance of the logo image LIM of the next frame based on the first logo map LM1 of the previous frame.

When the error determiner EJP determines that the logo images LIM of the first logo map LM1 and the second logo map LM2 do not match with each other, the error determiner EJP may determine whether to compensate for the luminance of the logo image LIM for the next frame based on the first determination data JD1.

When the error determiner EJP determines that the logo images LIM of the first logo map LM1 and the second logo map LM2 do not match with each other, and determines that the second logo map LM2 includes an error, the error determiner EJP may generate a second compensation control signal CCS2 for initializing the compensation data CDATA for the logo image LIM. In one embodiment, for example, when the logo images LIM of the first logo map LM1 and the second logo map LM2 do not match with each other and the second logo map LM2 includes an error, the logo image LIM is changed, but the changed logo image LIM may not be properly detected.

Figure 10C:
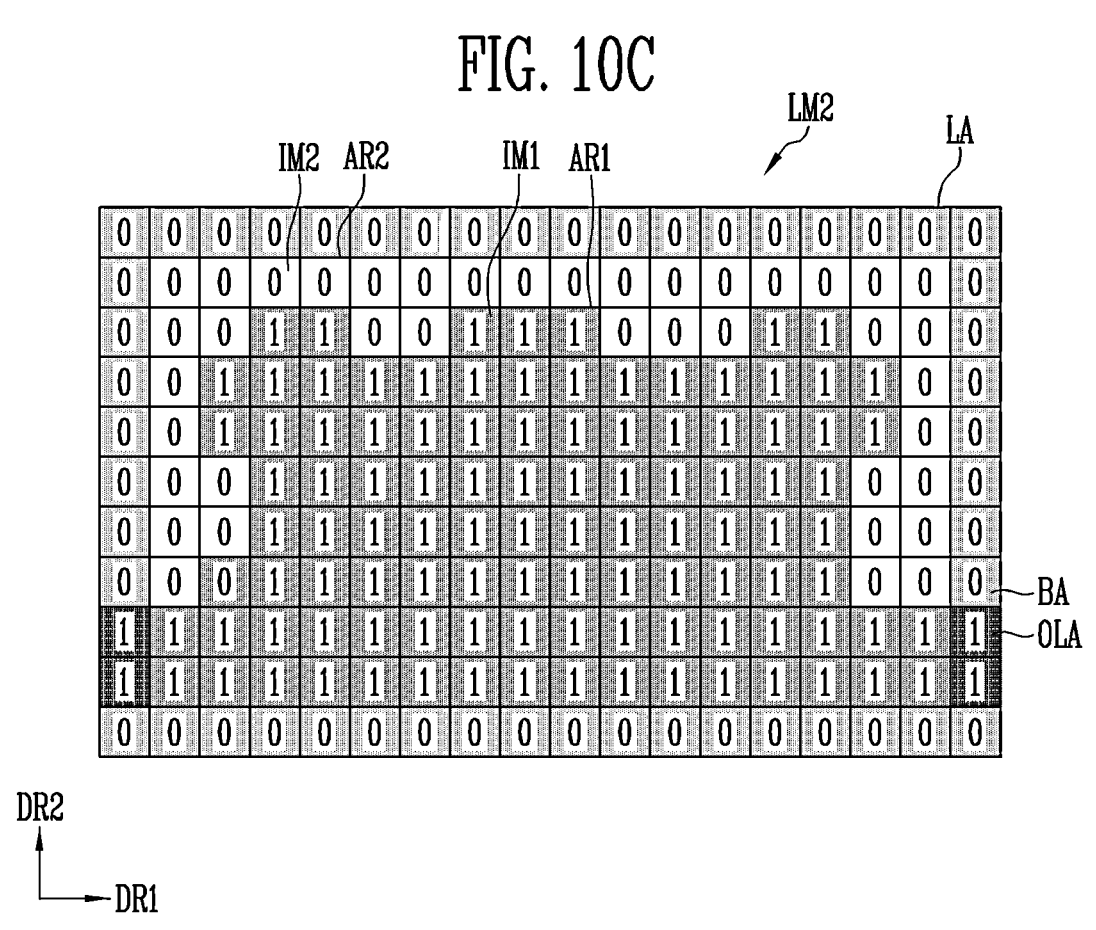

Referring to FIG. 9 and FIG. 10C, in the second logo map LM2, a pattern having the same or similar gray as the logo image LIM around the logo image LIM recognized as the first image IM1 in the first logo map LM1 may be entirely positioned in the boundary area BA, and accordingly, the first determination data JD1 (for example, the number of pixels PX positioned in the overlapping area OLA) is greater than or equal to the first threshold STH1. In an embodiment, the pattern occupies a relatively wide area within the logo area LA, and accordingly, the second determination data JD2 (for example, the number of mismatched pixels) may be greater than the second threshold STH2.

In such an embodiment, the error determiner EJP may determine that the second logo map LM2 includes an error and that the logo images LIM of the first logo map LM1 and the second logo map LM2 do not match with each other. Accordingly, the error determiner EJP may prevent the luminance of the logo background image LBI from being changed by initializing the logo map LM and/or compensation data CDATA for the logo image LIM. In such an embodiment, in the next frame, the luminance of the logo image LIM is not compensated, and the logo image LIM may be displayed with luminance corresponding to the input image signal RGB of the corresponding frame. In one embodiment, for example, in the next frame, the logo image LIM may be displayed with luminance brighter than that in the current frame.

When the error determiner EJP determines that the logo images LIM of the first logo map LM1 and the second logo map LM2 do not match, and determines that the second logo map LM2 does not include an error, the error determiner EJP may generate a third compensation control signal CCS3 for compensating the luminance of the logo image LIM of the next frame based on the second logo map LM2. Alternatively, the error determiner EJP does not generate a separate compensation control signal CCS instead of generating the third compensation control signal CCS3, so that the luminance compensation process for compensating the luminance of the logo image LIM of the next frame based on the second logo map LM2 generated in the current frame may be continued.

Figure 10D:
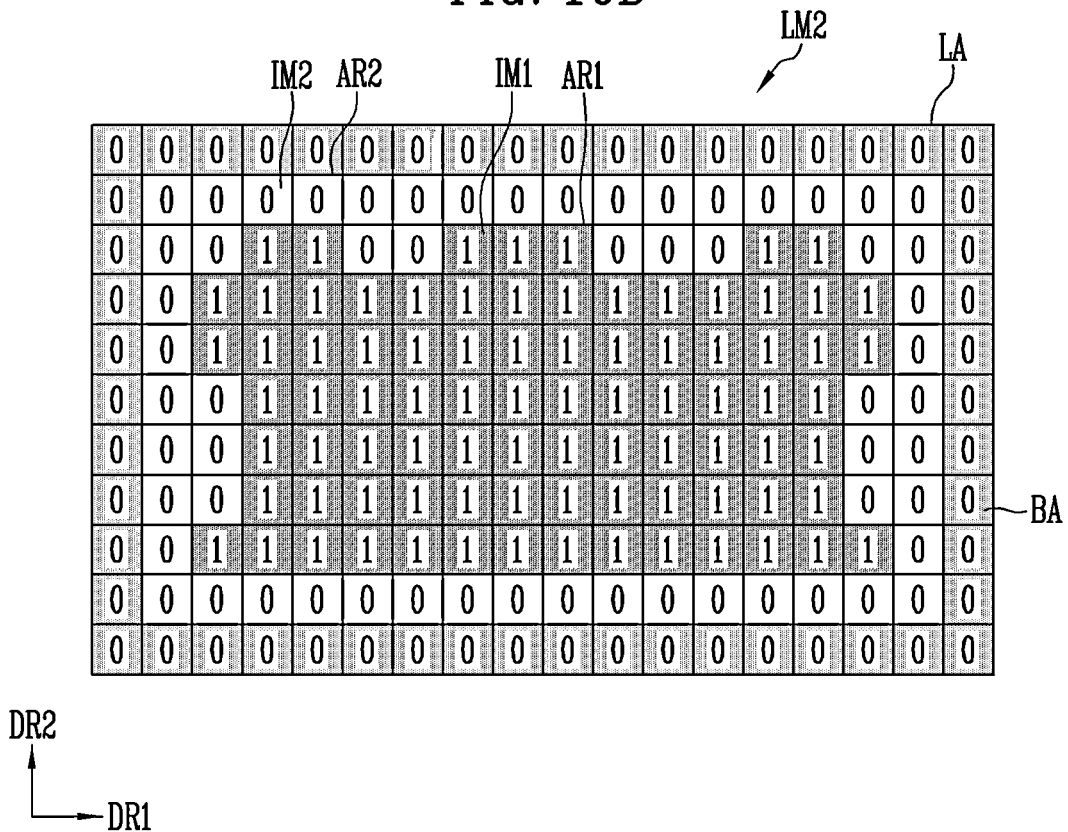

Referring to FIG. 9 and FIG. 10D, in the second logo map LM2, a pattern having the same or similar gray as the logo image LIM around the logo image LIM recognized as the first image IM1 in the first logo map LM1 may be positioned, but in this case, the first determination data JD1 may be less than the first threshold STH1. However, the pattern occupies a relatively wide area within the logo area LA, and accordingly, the second determination data JD2 (for example, the number of mismatched pixels) may be greater than the second threshold STH2.

In this case, the error determiner EJP may determine that the second logo map LM2 does not include an error and that the logo images LIM of the first logo map LM1 and the second logo map LM2 do not match with each other. In one embodiment, for example, when the logo image LIM included in the input image signal RGB is changed to characters and/or pictures of different patterns, the second logo map LM2 does not include an error, but the logo images LIM of the first logo map LM1 and the second logo map LM2 may not match.

Accordingly, the error determiner EJP may generate the third compensation control signal CCS3 so that the luminance of the logo image LIM of the next frame is compensated based on the second logo map LM2, or may allow the luminance compensation according to the logo map LM generated in real time without generating the compensation control signal CCS to be continuously performed. Accordingly, appropriate luminance compensation may be performed for the changed logo image LIM.

The luminance compensation block LUCB selectively compensates and/or changes luminance for the logo image LIM in response to the compensation control signal CCS. In one embodiment, for example, the luminance compensation block LUCB may compensate for luminance for the first image IM1 recognized as the logo image LIM or may output image data IMD of which luminance is not compensated, based on the compensation control signal CCS.

The luminance compensation block LUCB includes a compensation determiner CJP and a luminance compensator LUC. FIG. 7 illustrates an embodiment in which the compensation determiner CJP is included in the luminance compensation block LUCB, but the invention is not limited thereto. In one alternative embodiment, for example, the compensation determiner CJP may be a constituent element included in the logo determiner LJP.

The compensation determiner CJP may receive the compensation control signal CCS from the error determiner EJP, and may receive the logo map data LMD from the logo map generator LMG. In addition, the compensation determiner CJP may receive the compensation data CDATA from the timing controller TCON. The compensation determiner CJP may determine whether to compensate for luminance for the logo image LIM and/or the logo map LM to be used for the luminance compensation in response to the compensation control signal CCS.

When receiving the first compensation control signal CCS1, the compensation determiner CJP may output the first logo map data LMD1 and the compensation data CDATA corresponding to the first logo map LM1 to the luminance compensator LUC. In an embodiment, the compensation determiner CJP may supply the map control signal MCS to the logo map generator LMG in response to the first compensation control signal CCS1. The map control signal MCS is a signal for replacing the second logo map LM2 generated in the current frame with the first logo map LM1 generated in the previous frame, and may include, for example, the first logo map data LMD1.

When receiving the second compensation control signal CCS2, the compensation determiner CJP may not supply at least one selected from the logo map data LMD and the compensation data CDATA to the luminance compensator LUC. In addition, the compensation determiner CJP may generate a control signal for initializing at least one of the logo map LM and the compensation data CDATA in response to the second compensation control signal CCS2.

In one embodiment, for example, the compensation determiner CJP may generate the map control signal MCS for initializing the second logo map LM2 in response to the second compensation control signal CCS2, and may output the map control signal MCS to the logo map generator LMG. Accordingly, the logo map LM (for example, the second logo map LM2) may be initialized. In addition, the compensation determiner CJP may output a control signal for initializing compensation data CDATA to the timing controller TCON in response to the second compensation control signal CCS2.

When receiving the third compensation control signal CCS3 or not receiving a particular compensation control signal CCS, the compensation determiner CJP may output the second logo map data LMD2 and the compensation data CDATA corresponding to the second logo map LM2 to the luminance compensator LUC.

The luminance compensator LUC may receive the input image signal RGB from the outside. In addition, the luminance compensator LUC may receive the first or second logo map data LMD1 or LMD2 and the compensation data CDATA from the compensation determiner CJP, or may not receive at least one selected from the logo map data LMD and the compensation data CDATA.

In one embodiment, for example, when the first compensation control signal CCS1 is outputted from the error determiner EJP, the luminance compensator LUC may receive the first logo map data LMD1 and the compensation data CDATA from the compensation determiner CJP. When the second compensation control signal CCS2 is outputted from the error determiner EJP, the luminance compensator LUC may not receive at least one selected from the logo map data LMD and the compensation data CDATA. When the third compensation control signal CCS3 is outputted from the error determiner EJP or the compensation control signal CCS is not outputted from the error determiner EJP, the luminance compensator LUC may receive the second logo map data LMD2 and the compensation data CDATA from the compensation determiner CJP.

When receiving the first or second logo map data LMD1 or LMD2 and the compensation data CDATA, the luminance compensator LUC may compensate for the luminance of the first area AR1 of the logo area LA (that is, an area corresponding to an image recognized as the logo image LIM), based on the first or second logo map data LMD1 or LMD2 and the compensation data CDATA. In one embodiment, for example, the luminance compensator LUC may convert the input image signal RGB of the next frame to generate the image data IMD so that the luminance of the first area AR1 of the logo area LA may be changed (compensated) to a preset target luminance.

When at least one selected from the logo map data LMD and the compensation data CDATA is not received, the luminance compensator LUC does not compensate for the luminance of the logo area LA. When the logo map data LMD is not received, the luminance compensator LUC may not compensate for the luminance of the logo area LA because there is no information on an object to be compensated for the luminance. When the compensation data CDATA is not received, the luminance compensator LUC may not compensate for the luminance of the logo area LA because there is no information on target luminance, which is a degree of the luminance compensation for the logo area LA (especially, the first area AR1). In this case, the luminance compensator LUC may generate the image data IMD by converting the input image signal RGB without compensating for the luminance of the first area AR1.

Figure 11:
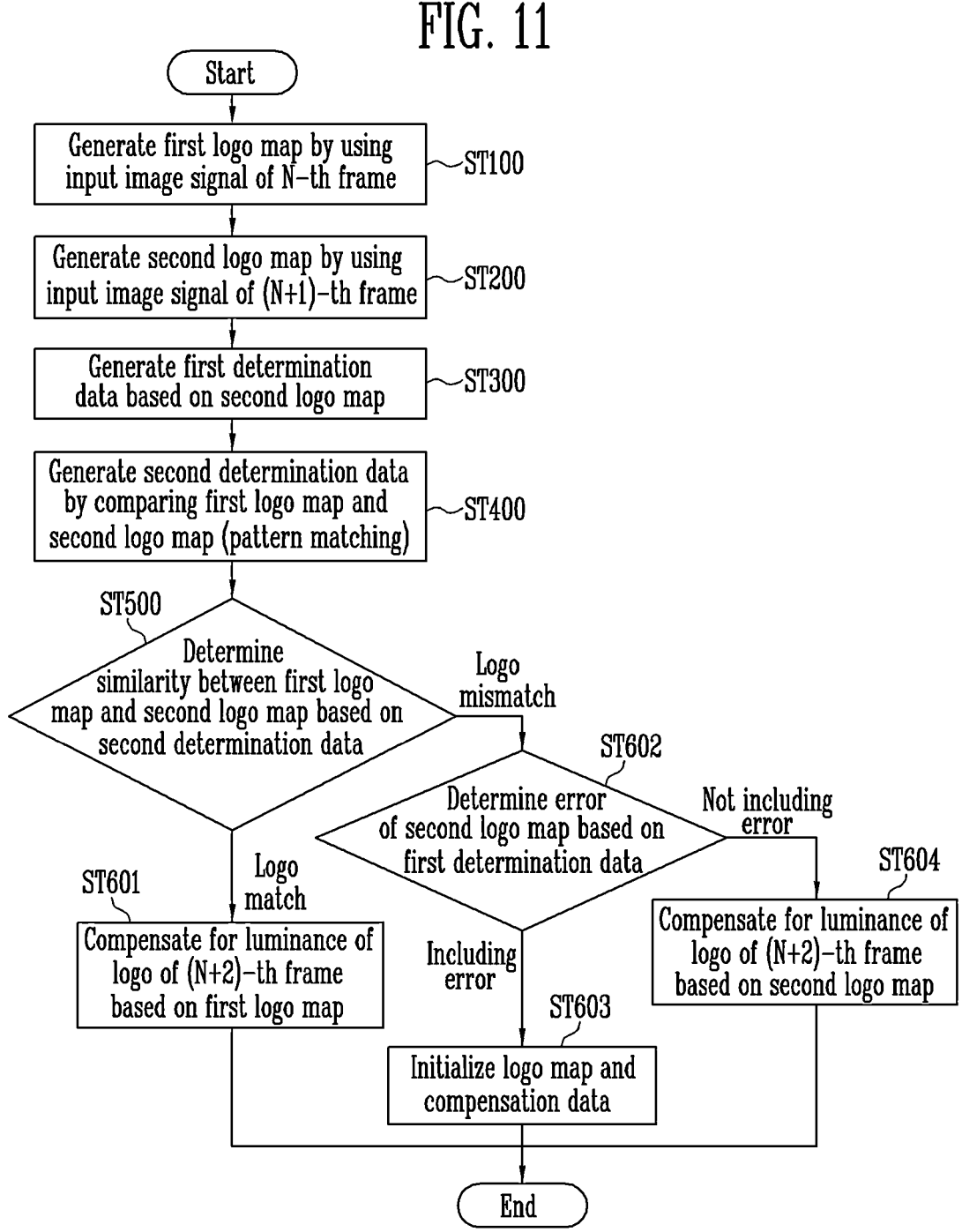
FIG. 11 illustrates a flowchart of a driving method of a display device according to an embodiment of the invention.

FIG. 11 illustrates a flowchart of a driving method of the display device DD according to the embodiment of the invention. Particularly, FIG. 11 illustrates a process of the driving method of the logo controller LCON for the luminance compensation method of the logo image LIM to be displayed in the (N+2)-th frame.

Referring to FIG. 1 to FIG. 11, the display device DD detects the logo image LIM and the logo area LA including the logo image LIM from the input image signal RGB of each frame based on the logo controller LCON, and compensates for the luminance of the logo image LIM. In one embodiment, for example, the display device DD may generate the image data IMD by converting the input image signal RGB so that the luminance of the logo image LIM may be lowered to a predetermined target luminance. Accordingly, the afterimage caused by continuously displaying the logo image LIM may be effectively prevented and the image quality of the display device DD may be improved.

An embodiment of an operation process of the logo controller LCON will hereinafter be describe in detail with reference of FIG. 11.

In an embodiment, as shown in FIG. 11, the logo controller LCON generates the first logo map LM1 based on the input image signal RGB of the N-th frame (ST1100).

Then, the logo controller LCON generates the second logo map LM2 based on the input image signal RGB of the (N+1)-th frame (ST200).

Next, the logo controller LCON selectively changes the luminance of the logo image LIM of the (N+2)-th frame based on the similarity between the first logo map LM1 and the second logo map LM2 and/or whether the second logo map LM2 includes an error. In such an embodiment, the logo controller LCON may operate as follows to selectively change the luminance of the logo image LIM of the (N+2)-th frame.

The logo controller LCON generates the first determination data JD1 based on the second logo map LM2 (ST300). In one embodiment, for example, the logo controller LCON may set the edge area (for example, an outermost area of a predetermined range within the logo area LA) of the logo area LA as the boundary area BA, and may generate the first determination data JD1 based on the boundary area data BAD for the boundary area BA. The first determination data JD1 may include information for determining whether the second logo map LM2 includes an error.

In addition, the logo controller LCON generates the second determination data JD2 by comparing the first logo map LM1 and the second logo map LM2 (ST400). In one embodiment, for example, the logo controller LCON may generate the second determination data JD2 through pattern matching between the first logo map LM1 and the second logo map LM2. The second determination data JD2 represents the similarity between the first logo map LM1 and the second logo map LM2, and may include information for determining whether the logo images LIM in the first logo map LM1 and the second logo map LM2 match.

In an embodiment, the logo controller LCON may sequentially generate the first determination data JD1 and the second determination data JD2. FIG. 7 and FIG. 11 illustrate an embodiment in which the second determination data JD2 is generated after the first determination data JD1 is first formed, but the order of generating the first determination data JD1 and the second determination data JD2 is not particularly limited. In an alternative embodiment, after the second determination data JD2 is first generated, the first determination data JD1 may be generated. In another alternative embodiment, the logo controller LCON may generate the first determination data JD1 and the second determination data JD2 simultaneously and/or in parallel.

Next, the logo controller LCON determines the similarity between the first logo map LM1 and the second logo map LM2 based on the second determination data JD2 (ST500). In one embodiment, for example, the logo controller LCON determines whether the logo images LIM of the first logo map LM1 and the second logo map LM2 match based on the second determination data JD2.

When the logo controller LCON determines that the logo images LIM of the first logo map LM1 and the second logo map LM2 match with each other (Logo match), the logo controller LCON compensates for the luminance of the logo image LIM of the (N+2)-th frame based on the first logo map LM1 (ST601). In this case, the logo controller LCON may maintain the first logo map LM1 and the compensation data CDATA applied (or being applied) to the logo compensation of the (N+1)-th frame.

When the logo controller LCON determines that the logo images LIM of the first logo map LM1 and the second logo map LM2 do not match with each other (Logo mismatch), the logo controller LCON selectively compensates for the luminance of the logo image LIM of the (N+2)-th frame based on the first determination data JD1. In this case, the logo controller LCON determines whether the second logo map LM2 includes an error based on the first determination data JD1 (ST602).

When the logo controller LCON determines that the second logo map LM2 includes an error (Including error), the logo controller LCON initializes the logo map LM (for example, the second logo map LM2) and/or the compensation data CDATA (ST603). In this case, in the (N+2)-th frame, the luminance of the logo image LIM is not compensated, and the logo image LIM may be displayed with luminance corresponding to a gray of the input image signal RGB.

When the logo controller LCON determines that the second logo map LM2 does not include an error (not including error) (for example, when it determines that the second logo map LM2 is normal), the logo controller LCON compensates for the luminance of the logo image LIM of the (N+2)-th frame based on the second logo map LM2 (ST604). In this case, the logo controller LCON may maintain the second logo map LM2 and the compensation data CDATA.

According to embodiments of the display device DD and the driving method thereof according to the invention, as set forth herein, the luminance of the logo image LIM is compensated by detecting the logo image LIM of each frame and the logo area LA including the logo image LIM. Accordingly, the afterimage caused by continuously displaying the logo image LIM may be effectively prevented and the image quality of the display device DD may be improved.

In such embodiments of the invention, the first logo map LM1 is generated based on the input image signal RGB of the previous frame, the second logo map LM2 is generated based on the input image signal RGB of the current frame, and the luminance of the logo image LIM of the next frame is selectively changed by determining the similarity between the first logo map LM1 and the second logo map LM2. In such embodiments, when it is determined that the logo images LIM of the first logo map LM1 and the second logo map LM2 match with each other, the luminance of the logo image LIM of the next frame is compensated based on the first logo map LM1. Accordingly, the luminance of the logo image LIM may be effectively prevented from being suddenly and/or frequently changed, thereby efficiently compensating for the luminance of the logo image LIM.

In such embodiments, the edge area of the logo area LA may be set as the boundary area BA, and whether or not the second logo map LM2 includes an error may be determined in real time based on the boundary area data BAD for the boundary area BA. In such embodiments, when it is determined that the logo images LIM of the first logo map LM1 and the second logo map LM2 do not match with each other, the luminance of the logo image LIM of the next frame may be selectively compensated based on the determination on whether the second logo map LM2 includes an error. Accordingly, the luminance of the logo background image LBI may be effectively prevented from being changed due to a logo detection error, thereby increasing the accuracy of logo compensation.

Therefore, according to embodiments of the invention, by determining the similarity between the logo maps LM of the previous frame and the current frame and/or the error of the logo map LM of the current frame in real time, the luminance of the logo image LIM may be accurately and efficiently compensated such that the afterimage and the image quality may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
pixels arranged in a display area;
a timing controller which generates image data of each frame based on an input image signal of the each frame, wherein the timing controller includes a logo controller which detects a logo image and a logo area including the logo image from the input image signal of the each frame to control luminance of the logo image; and
a data driver which generates a data signal based on the image data and supplies the data signal to the pixels, wherein the logo controller
generates a first logo map based on an input image signal of a previous frame,
generates a second logo map based on an input image signal of a current frame,
determines a similarity between the first logo map and the second logo map to selectively change luminance of a logo image of a next frame,
determines whether logo images in the first logo map and the second logo map match with each other based on the similarity between the first logo map and the second logo map, and
compensates for the luminance of the logo image of the next frame based on the first logo map when it is determined that logo images in the first logo map and the second logo map match with each other.

2. The display device of claim 1, wherein
the logo controller
sets an edge area of the logo area as a boundary area,
determines whether the second logo map includes an error based on boundary area data for the boundary area, and
initializes compensation data for the logo image when it is determined that the logo images in the first logo map and the second logo map do not match with each other and the second logo map includes the error.

3. The display device of claim 1, wherein
the logo controller
sets an edge area of the logo area as a boundary area,
determines whether the second logo map includes an error based on boundary area data for the boundary area, and
compensates for the luminance of the logo image of the next frame based on the second logo map when it is determined that the logo images in the first logo map and the second logo map do not match with each other and the second logo map does not include the error.

4. A display device comprising:
pixels arranged in a display area;
a timing controller which generates image data of each frame based on an input image signal of the each frame, wherein the timing controller includes a logo controller which detects a logo image and a logo area including the logo image from the input image signal of the each frame to control luminance of the logo image; and
a data driver which generates a data signal based on the image data and supplies the data signal to the pixels, wherein the logo controller
generates a first logo map based on an input image signal of a previous frame,
generates a second logo map based on an input image signal of a current frame, and
determines a similarity between the first logo map and the second logo map to selectively change luminance of a logo image of a next frame, wherein
the logo controller includes:
a logo extractor which detects the logo image and the logo area from the input image signal of the each frame to extract logo area data;
a logo map generator which generates the first logo map based on the logo area data of the previous frame and generates the second logo map based on the logo area data of the current frame;
a logo determiner which generates first determination data based on the second logo map, compares the first logo map and the second logo map to generate second determination data, and generates a compensation control signal based on the first determination data and the second determination data; and
a luminance compensation block which selectively compensates for the luminance of the logo image in response to the compensation control signal.

5. The display device of claim 4, wherein
the logo determiner includes a pattern comparator which generates the second determination data through pattern matching between the first logo map and the second logo map.

6. The display device of claim 5, wherein
the pattern comparator
compares data for respective coordinates of the first logo map and the second logo map, and
detects the number of pixels in which the data of the first logo map and the second logo map do not match with each other at the respective coordinates to generate the second determination data.

7. The display device of claim 5, wherein
the logo determiner further includes
a boundary setter which sets a partial area positioned around an edge of the logo area as a boundary area and generates boundary area data including information on the boundary area; and
a calculator which generates the first determination data by counting the number of pixels positioned in an area where a first area corresponding to a first image recognized as the logo image and the boundary area overlap each other, based on the boundary area data.

8. The display device of claim 7, wherein
the logo determiner further includes an error determiner which generates the compensation control signal based on the first determination data and the second determination data.

9. The display device of claim 8, wherein
the error determiner
compares the first determination data with a first threshold to determine whether the second logo map includes an error, and
compares the second determination data with a second threshold to determine whether the logo images in the first logo map and the second logo map match with each other.

10. The display device of claim 9, wherein
the error determiner, when it is determined that the logo images in the first logo map and the second logo map match with each other, generates a first compensation control signal.

11. The display device of claim 10, wherein
the luminance compensation block includes
a compensation determiner which outputs first logo map data and compensation data corresponding to the first logo map in response to the first compensation control signal; and
a luminance compensator which converts the input image signal of the next frame based on the first logo map data and the compensation data to generate the image data.

12. The display device of claim 9, wherein
the error determiner, when it is determined that the logo images in the first logo map and the second logo map do not match with each other and the second logo map includes the error, generates a second compensation control signal.

13. The display device of claim 12, wherein
the luminance compensation block includes a compensation determiner which outputs a map control signal for initializing the second logo map to the logo map generator in response to the second compensation control signal.

14. The display device of claim 9, wherein
the error determiner, when it is determined that the logo images in the first logo map and the second logo map do not match with each other and the second logo map does not include the error, generates a third compensation control signal.

15. The display device of claim 14, wherein
the luminance compensation block includes
a compensation determiner which outputs second logo map data and compensation data corresponding to the second logo map in response to the third compensation control signal; and
a luminance compensator which converts the input image signal of the next frame based on the second logo map data and the compensation data to generate the image data.

16. A driving method of a display device which detects a logo image and a logo area including the logo image from an input image signal of each frame to compensate for luminance of the logo image, the driving method of the display device comprising:
generating a first logo map based on an input image signal of an N-th frame, wherein N is a natural number;
generating a second logo map based on an input image signal of an (N+1)-th frame; and
selectively changing luminance of a logo image of an (N+2)-th frame by determining a similarity between the first logo map and the second logo map,
wherein
when it is determined that the logo images in the first logo map and the second logo map match with each other based on a result of determining the similarity between the first logo map and the second logo map, the luminance of the logo image of the (N+2)-th frame is compensated based on the first logo map.

17. The driving method of the display device of claim 16, further comprising
setting an edge area of the logo area as a boundary area; and
determining whether the second logo map includes an error based on boundary area data for the boundary area,
wherein when it is determined that the logo images in the first logo map and the second logo map do not match with each other and the second logo map includes the error, compensation data for the logo image is initialized.

18. The driving method of the display device of claim 16, further comprising:
setting an edge area of the logo area as a boundary area; and
determining whether the second logo map includes an error based on boundary area data for the boundary area,
wherein when it is determined that the logo images in the first logo map and the second logo map do not match with each other and the second logo map does not include the error, the luminance of the logo image of the (N+2)-th frame is compensated based on the second logo map.

* * * * *